(12) United States Patent
Oh et al.

(10) Patent No.: US 10,863,159 B2
(45) Date of Patent: Dec. 8, 2020

(54) FIELD-OF-VIEW PREDICTION METHOD BASED ON CONTEXTUAL INFORMATION FOR 360-DEGREE VR VIDEO

(71) Applicant: PCMS Holdings, Inc., Wilmington, DE (US)

(72) Inventors: Hyun Oh Oh, Seoul (KR); Jin Sam Kwak, Uiwang-si (KR); JuHyung Son, Uiwang-si (KR)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/477,152

(22) PCT Filed: Jan. 11, 2018

(86) PCT No.: PCT/US2018/013358
§ 371 (c)(1),
(2) Date: Jul. 10, 2019

(87) PCT Pub. No.: WO2018/136301
PCT Pub. Date: Jul. 26, 2018

(65) Prior Publication Data
US 2019/0356894 A1    Nov. 21, 2019

Related U.S. Application Data

(60) Provisional application No. 62/448,682, filed on Jan. 20, 2017.

(51) Int. Cl.
*H04N 13/117* (2018.01)
*H04N 13/344* (2018.01)
*G02B 27/01* (2006.01)

(52) U.S. Cl.
CPC ....... *H04N 13/117* (2018.05); *G02B 27/0172* (2013.01); *H04N 13/344* (2018.05); *G02B 2027/0147* (2013.01)

(58) Field of Classification Search
USPC .......................................................... 348/51
See application file for complete search history.

(56) References Cited

U.S. PATENT DOCUMENTS 9,942,511 B2 *   4/2018   Jung ................... H04N 1/00148
10,681,313 B1 *  6/2020   Day ........................ H04N 7/183
(Continued)

FOREIGN PATENT DOCUMENTS

WO    2016191694 A1    12/2016

OTHER PUBLICATIONS

International Preliminary Report on Patentability for PCT/US2018/013358 dated Jul. 23, 2019, 7 pages.
(Continued)

*Primary Examiner* — Behrooz M Senfi
(74) *Attorney, Agent, or Firm* — Invention Mine LLC

(57) ABSTRACT

Systems and methods described that provide for sending a first temporal portion of video to a client, wherein video quality of a first spatial region associated with a first direction of view is sent with higher quality than video data for another spatial region not associated with the first direction of view; sending a second temporal portion of the video to the client; and responsive to determining that a significant event, audio or video or a combination, occurred during the second temporal portion and corresponds with a second direction of view that is associated with a second spatial region, sending higher quality video for the second spatial region than video data for another spatial region. Virtual reality (VR) video, including 360-degree VR video may thus be foveated, based on contextual information in the video data and corresponding audio data, combined with field of view predictions based upon user motion.

15 Claims, 25 Drawing Sheets

(56) References Cited

U.S. PATENT DOCUMENTS

| | | | | |
|---|---|---|---|---|
| 2008/0165861 | A1* | 7/2008 | Wen | H04N 19/139 375/240.26 |
| 2008/0198270 | A1* | 8/2008 | Hobbs | H04N 19/44 348/708 |
| 2011/0305278 | A1* | 12/2011 | Fablet | H04N 7/17336 375/240.12 |
| 2014/0267429 | A1 | 9/2014 | Justice | |
| 2015/0249813 | A1 | 9/2015 | Cole | |
| 2016/0012855 | A1 | 1/2016 | Krishnan | |
| 2016/0029091 | A1* | 1/2016 | Le Floch | H04N 21/234345 375/240.26 |
| 2016/0133170 | A1 | 5/2016 | Fateh | |
| 2016/0150212 | A1* | 5/2016 | Moura | H04N 19/597 375/240.02 |
| 2016/0260196 | A1 | 9/2016 | Roimela | |
| 2017/0006081 | A1* | 1/2017 | Grandl | H04L 65/80 |

OTHER PUBLICATIONS

Wikipedia, "5.1 Surround Sound". Wikipedia, The Free Encyclopedia, available at: https://en.wikipedia.org/w/index.php?title=5.1_surround_sound&oldid=757613103, Dec. 31, 2016, 3 pages.

Wikipedia, "7.1 Surround Sound". Wikipedia, The Free Encyclopedia, available at: https://en.wikipedia.org/w/index.php?title=7.1_surround_sound&oldid=757310537, Dec. 29, 2016, 3 pages.

International Search Report and Written Opinion of the International Searching Authority for PCT/US2018/013358 dated Apr. 4, 2018.

Alface, P., et. al., "Interactive Omnidirectional Video Delivery: A Bandwidth-Effective Approach". Bell Labs Technical Journal, vol. 16, No. 4, (2012), pp. 135-147.

Lavalle, S., "The Latent Power of Prediction". Oculus Developer Blog, available at: https://developer3.oculus.com/blog/the-latent-power-of-prediction/, Jul. 12, 2013, 7 pages.

Wikipedia, "Virtual Reality Headset". Wikipedia web article, available at: https://en.wikipedia.org/w/index.php?title=Virtual_reality_headset&oldid=759169952, modified on Jan. 9, 2017, 5 pages.

Byford, S. "Oculus Founder Says Cables Are a 'Major Obstacle' to VR's Success on PC". The Virge, Nov. 1, 2015, available at: http://web.archive.org/web/20161221004828/http://www.theverge.com/2015/11/1/9656756/oculus-rift-wireless-cables-mobile, 2 pages.

Novet, J. "Facebook Open-Sources Transform, A Tool That Cuts 360-Degree Video File Size by 25%". Venture Beat, Jan. 21, 2016, available at: http://web.archive.org/web/20170120121057/http://venturebeat.com/2016/01/21/facebook-open-sources-transform-a-tool-that-cuts-360-degree-video-file-size-by-25/, 2 pages.

Wikipedia, "Video Content Analysis". Wikipedia web article, available at: https://en.wikipedia.org/w/index.php?title=Video_content_analysis&oldid=758527117, modified on Jan. 6, 2017, 4 pages.

Hong, S., "Comparison of Vertical and Horizontal Eye Movement Times in the Selection of Visual Targets by an Eye Input Device". Available at: www.jesk.or.kr/archive/download?study_id=1108&dn_type=pdf, Journal of the Ergonomics Society of Korea, vol. 34, No. 1, (2015), pp. 19-27.

Pulkki, V., "Virtual Sound Source Positioning Using Vector Based Amplitude Panning". Available at: http://lib.tkk.fi/Diss/2001/isbn9512255324/article1.pdf, Journal of the Audio Engineering Society, vol. 45, No. 6, Jun. 1997, pp. 456-466.

International Telecommunication Union, "Multichannel Sound Technology in Home and Broadcasting Applications". Available at: https://www.itu.int/dms_pub/itu-r/opb/rep/R-REP-BS.2159-2009-PDF-E.pdf, ITU-R BS.2159, BS Series, Nov. 2009, 29 pages.

Wikipedia, "Surround Sound". Wikipedia web article, available at: https://en.wikipedia.org/w/index.php?title=Surround_sound&oldid=755485466, modified on Dec. 18, 2016, 9 pages.

* cited by examiner

FIELD-OF-VIEW PREDICTION METHOD BASED ON CONTEXTUAL INFORMATION FOR 360-DEGREE VR VIDEO

CROSS-REFERENCE TO RELATED APPLICATIONS

The present application is a national stage application under 35 U.S.C. 371 of International Application No. PCT/US2018/013358, entitled "Field-of-View Prediction Method Based on Contextual Information for 360-Degree VR Video Streaming Services," filed on Jan. 11, 2018, which claims benefit under 35 U.S.C. § 119(e) from U.S. Provisional Patent Application Ser. No. 62/448,682, entitled "Field-of-View Prediction Method Based on Contextual Information for 360-Degree VR Video Streaming Services," filed Jan. 20, 2017, the disclosure of which is hereby incorporated by reference in its entirety.

BACKGROUND

Streaming 360-degree virtual reality (VR) video content to user devices uses a significant amount of bandwidth, and there may be motivation to minimize network bandwidth usage while maximizing high quality VR experiences. Some VR video contains 360-degree views of each scene and enables users to control the field of view (FOV) by themselves within a spherical VR video environment. User devices can range among any type that decodes and plays VR video, such as mobile head-mounted displays (HMDs), tethered PC-based HMDs, smartphones, tablets, and PCs. Due to the wider-degree display and an ultrashort viewing distance of VR HMDs (a few centimeters), a high pixel resolution is required for VR video (e.g. 8K or higher). Thus, VR video typically has much larger file sizes than conventional video contents. Streaming VR video over a network may thus consume a large amount of bandwidth.

YouTube offers 360-degree VR (360 VR) video streaming service along with spatial audio. Previous 360 VR video streaming platforms delivered the entire-degree view of video with relatively low resolutions, regardless of each user's current FOV. Unfortunately, even though the contents streaming server selects high resolution tiles based on the users current FOV, the tiles may be misaligned to a future FOV if they are actually played after networking and buffering delays, because the user may have changed the FOV.

FIG. 1 is a three-dimensional (3D) plan view of a 360 video streaming display at times $t_1$ and $t_2$. Two subsequent temporal segments, 201 and 203, of the entire video data set for the two different times are illustrated. Within the earlier first temporal segment 201, at time $t_1$, a user's HMD will display a first FOV 202. Within the subsequent second temporal segment 203, at time $t_2$, the users HMD will display a second FOV 204. A content server (not shown) may operate to predict, at time $t_1$, the FOV 204 for time $t_2$. However, if the time difference between $t_1$ and $t_2$ is large due to transmission delays, there will be insufficient information at time $t_1$ to predict the future (at time $t_2$) FOV 204 according to prior art methods. Therefore, there is a problem in predicting the FOV region in VR streaming applications.

PC-Based Tethered VR Scenarios.

For a desktop- (or laptop-) based tethered VR (such as Oculus Rift), a similar problem called the head prediction problem occurs. Newer HMDs have internal inertial measurement (IMU) sensors that may sense the change of direction of an FOV using sensed motion information.

FIG. 2 shows a flow diagram for capturing motion data and displaying a new VR image. Captured data from sensed HMD motion 205 is transmitted via a USB cable 206 to a game engine (or VR host computer) 207. When VR host computer 207 receives the user's latest FOV from HMDs through USB cable 206, VR host 207 may generate a VR image 208 based on the FOV. After the generated VR image is transmitted (or written) to the HMD, as illustrated in box 209, the VR host may display the VR image (including performing pixel switching) to the user in box 210.

Unfortunately, there may be Motion-To-Photon (MTP) latency that produces a mismatch between the displayed VR image and the users expected FOV, based on the user's head movement. MTP latency results from the accumulation of delays (from all sources, including FOV calculations and video processing) between the physical movement of a user's head and updated photons from a head mounted display reaching the user's eyes. With MTP latency, the FOV seen by the user is not fully aligned with the users expectations, immediately.

Because a users head freely rotates, presenting the correct image to users eyes with an HMD involves displaying images for a moving target. Human sensory systems may detect very small relative delays, but MTP latencies below approximately 20 milliseconds may sometimes be imperceptible. In VR, latency is widely recognized as a key source of disorientation and disbelief.

To counter MTP latency, the Oculus system attempts to predict a user's head movement. The current FOV is reported by a sensor that provides the direction in which the user is currently looking, and the VR computer renders the image for an FOV that corresponds to predicted head position, rather than where the head was. Oculus currently predicts the future head position based on constant acceleration-based prediction methods. The Oculus system predicts based on the current measured angular velocity and angular acceleration, assuming that a users head will move consistently in a certain direction during the display delay. Oculus makes very short-term (milliseconds) future FOV predictions, relying on the current FOV and a straight-forward prediction method.

VR Video Streaming Scenarios.

Facebook recently introduced software that enables efficient streaming of 360-degree videos, including equirectangular-, cube-, and pyramid-type VR video encoding models used by Facebook's 360 video encoding software. In the cube type model, instead of projecting 360 video on a sphere (equirectangular), the software projects different views onto a cube. In this sense, the unfolded picture is not distorted, which benefits a conventional video coding technique to compensate for motion. In the pyramid-type model, which is still going through beta testing, the software pre-renders the video with more than 30 different views in the server, based on pyramid-type variable resolution scaling. Therefore, for each 1 second amount of VR video, there are 30 different pyramid-type video files focusing on 30 different FOVs. While the pyramid model may reduce each video file size by 80%, the pyramid model has drawbacks in that 30 video files need to be stored on the server. If a 360 video is uploaded, the video is transformed from an equirectangular layout to the pyramid format for each of the 30 FOVs, and the server creates five different resolution versions of pyramid-type file chunks for each 1 second, resulting in a total of 150 different video chunks for 1 second of VR video. So, such a method uses more server storage space in order to reduce network bandwidth. Even though each client requests the next video chunk based on the current user's FOV, there is inevitable round-trip network and buffering delay that may make the client's selection obsolete by the time the video is to be displayed.

SUMMARY

Systems and methods are provided for sending video, including 360-degree virtual reality (VR) video, to a client. In exemplary embodiments, the video comprises a plurality of spatial regions, such as tiles, and the quality level at which spatial regions are sent to the client is determined based at least in part on characteristics of audio or video events associated with (i.e., in substantially the same direction as) the spatial region. The quality level may also be based at least in part on a direction of view of the viewer. For example, spatial regions toward which the user is looking may be sent to the client with relatively high video quality, and spatial regions that correspond to the direction of significant audio sources or video objects may also be sent with relatively high video quality (anticipating the probability that a viewer will turn toward those sources), while some or all of the other spatial regions that are outside the viewers field of view and that do not contain significant audio sources may be sent with a relatively lower video quality to save on bandwidth. The selection of video quality level for different spatial regions may be performed adaptively as the position of audio or video sources changes (and as the direction of view changes). Foveation may be used based upon a users actual FOV and FOV predictions based on audio and/or video events. For example, in some embodiments, each spatial region comprises a plurality of temporal segments, and a selection of video quality for a spatial region is determined adaptively on a segment-by-segment basis.

BRIEF DESCRIPTION OF THE DRAWINGS

A more detailed understanding may be had from the following description, presented by way of example in conjunction with the accompanying drawings.

Figure 1:
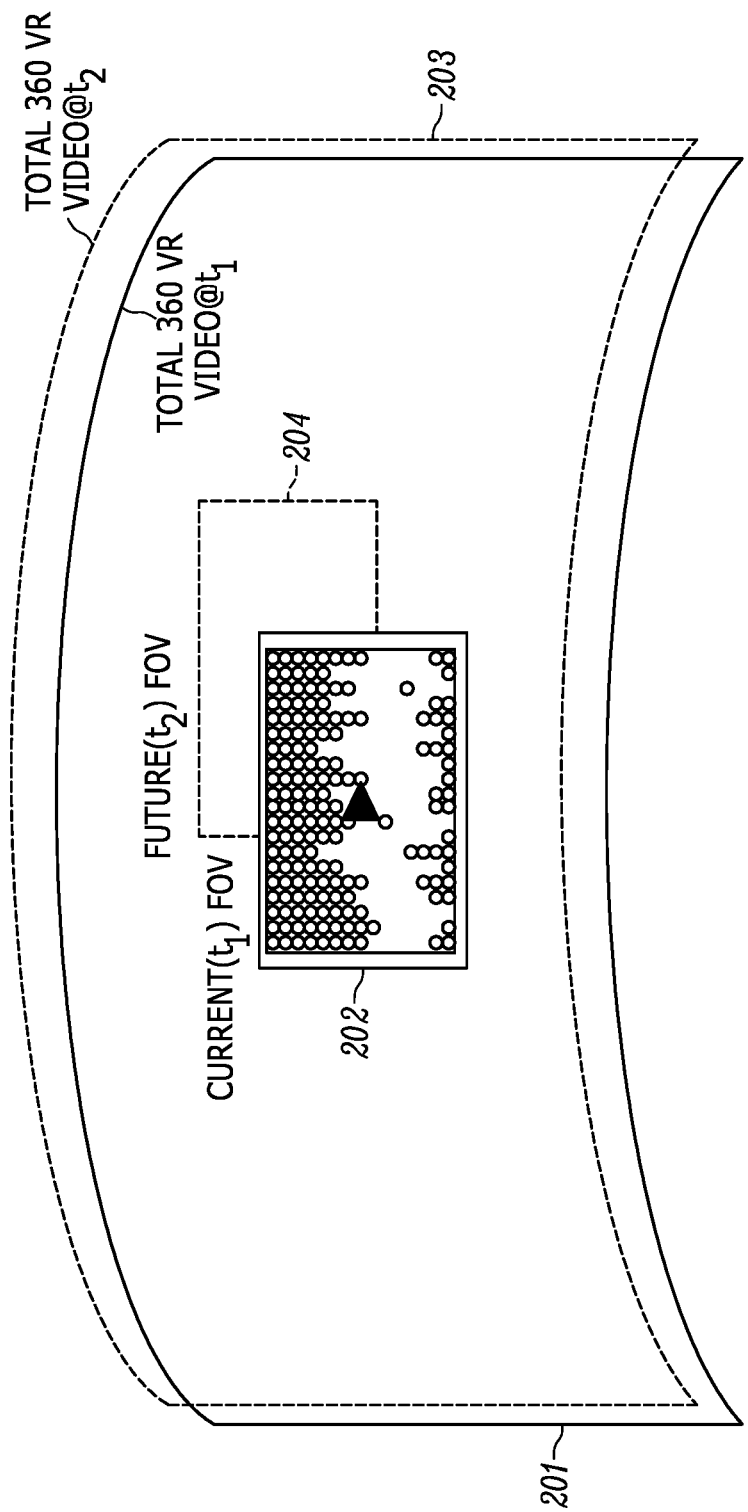
FIG. 1 is a schematic perspective view of a 360-degree video streaming display at times $t_1$ and $t_2$.
Figure 2:
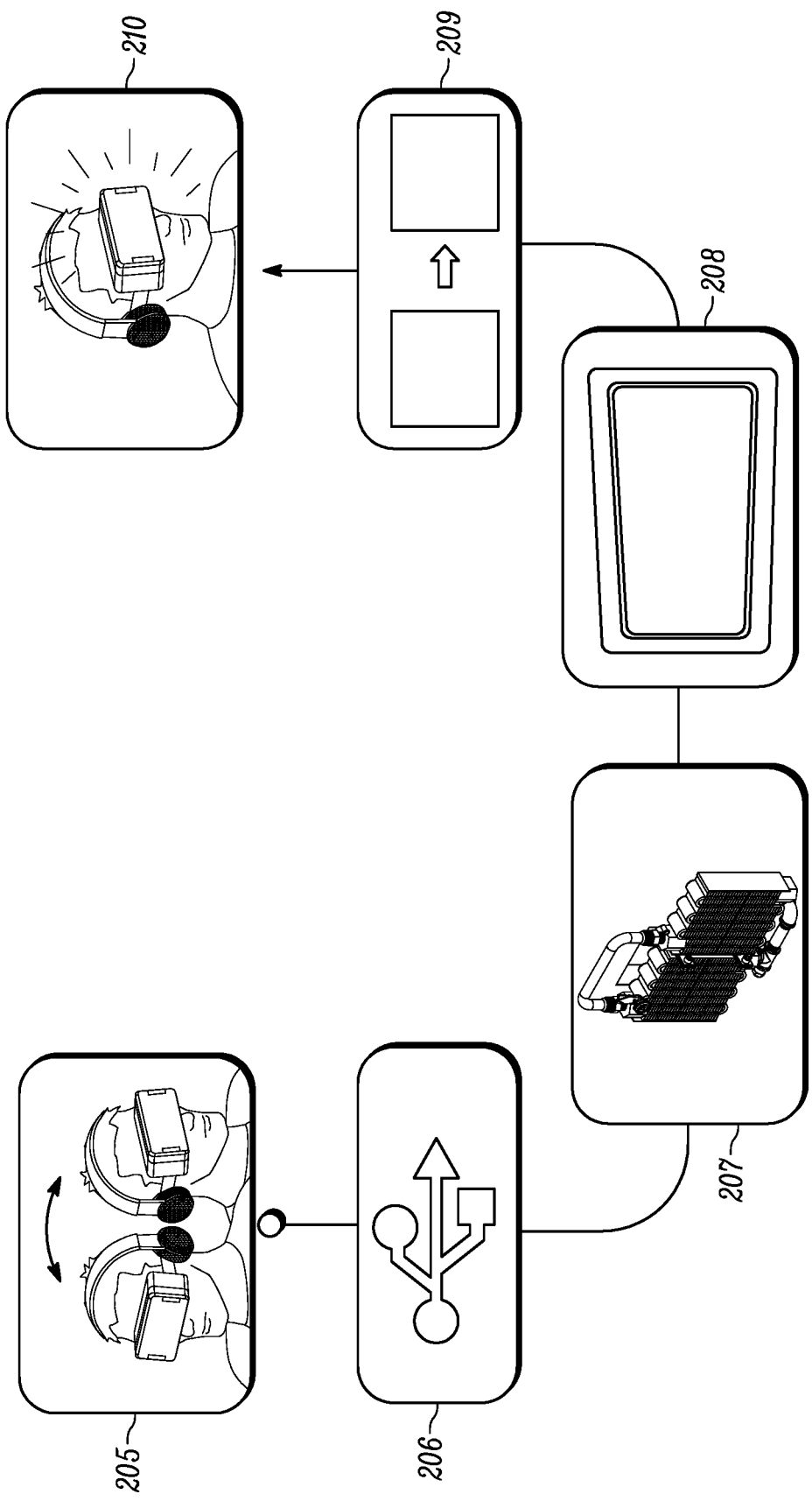
FIG. 2 is a block diagram that shows a flow diagram for capturing motion data and displaying a new VR image.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ."

DETAILED DESCRIPTION

Streaming a 360-degree VR video uses a large amount of bandwidth, even though users may watch only a certain portion of the entire transmitted frames. Systems and methods described herein encode selected portions at a higher resolution, or higher quality, than others. Ideally, to minimize streaming video data size while maximizing content resolution, the VR content server delivers high resolution VR video tiles corresponding to the user's Field-of-View (FOV) along with low resolution tiles not matching either an actual or predicted FOV. If the streaming sever does not have the user's current FOV information, the streaming server may send whole VR video frames. Each VR video frame may be spatially split into multiple tiles and only a subset of tiles corresponding to the FOV may be encoded with high resolution. The high-resolution FOV tiles are sent along with other low-resolution non-FOV tiles. However, a FOV may change during a network and buffering delay, which may result in unmatched (low-resolution) tiles being played (or displayed).

For systems and methods described herein, a relatively long-term future FOV prediction method based on audio and/or video contextual information corresponding to the video may be combined with individual user contextual information. Based on contextual weight calculations, tiles that have a higher probability of being matched to a user's future FOV region are transmitted at a higher resolution while the other tiles are transmitted at a lower resolution. For some embodiments, the audio/video contextual weights are calculated offline from the uploaded VR video contents, while the user contextual weight is obtained from the user's current FOV and VR video playout environments.

Systems and methods described herein may be used for video streaming where network latency and buffering requirements are large with relatively long-term (seconds) FOV prediction times. Therefore, systems and methods described herein predict a future FOV using contextual information obtained from video.

Contextual-information-based prediction methods described herein may be applied in conjunction with a constant-angular-motion or constant-angular-acceleration prediction method. Such a combination may be beneficial when the delay between the host computer and a tethered HMD is relatively large. A host computer and a tethered HMD may be connected with wire cables (such as HDMI or USB) to provide short and stable Motion-To-Photon (MTP) delays to minimize users discomfort with VR experiences. Systems and methods described herein provide a more stable method to predict a user's future FOV.

One FOV prediction method described herein may be used in conjunction with known pre-encoding methods. In many situations, an FOV is constantly changing, so for every second (or more often), the video client determines which video chunk to fetch based on a current FOV for displaying after a network/buffering delay. During these times, a prediction method based on contextual information of the video contents may be used to select video files that match to a users predicted future FOV.

Figure 3:
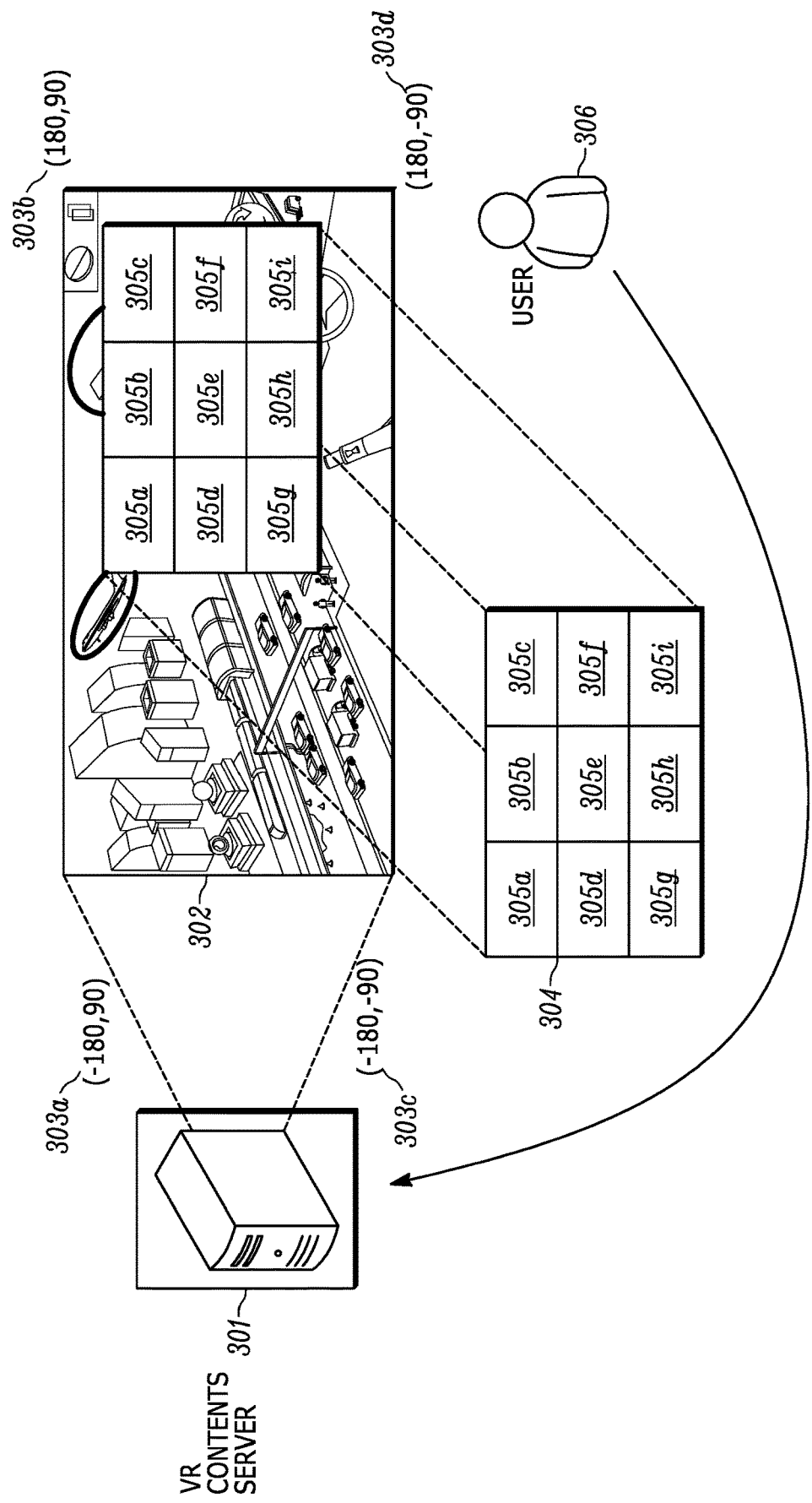
FIG. 3 is a block diagram for a method of streaming VR video.

FIG. 3 shows a block diagram for a method of streaming VR video. One method to stream VR video to a user with an efficient bandwidth and maximum video quality is to split the VR video into spatial regions. A subset of the regions is sent with high resolutions that match, or are associated with, a users FOV, while the other non-matched regions, that are not associated with the users FOV, are sent with lower resolutions. For example, a reference VR video may be split into distinct rectangular regions, called tiles, and only certain tiles may be sent with high resolutions that are associated (i.e., show video in substantially the same direction as) the user's FOV.

In FIG. 3, a VR server 301 generates a temporal segment of video 302, demarked at the corners with angular coordinates 303a-d (shown in degrees). In this example illustration, angular coordinates 303a and 303b converge to a single overhead point, while angular coordinates 303c and 303d converge to a single point straight downward, defining a sphere. As a result temporal segment of video 302 contains 360-degree views, and is thus 360-degree VR (360 VR) video. Within temporal segment of video 302, is a region 304 that is associated with the FOV of a user 306. Region 304 comprises a set of tiles 305a-i.

Figure 4:
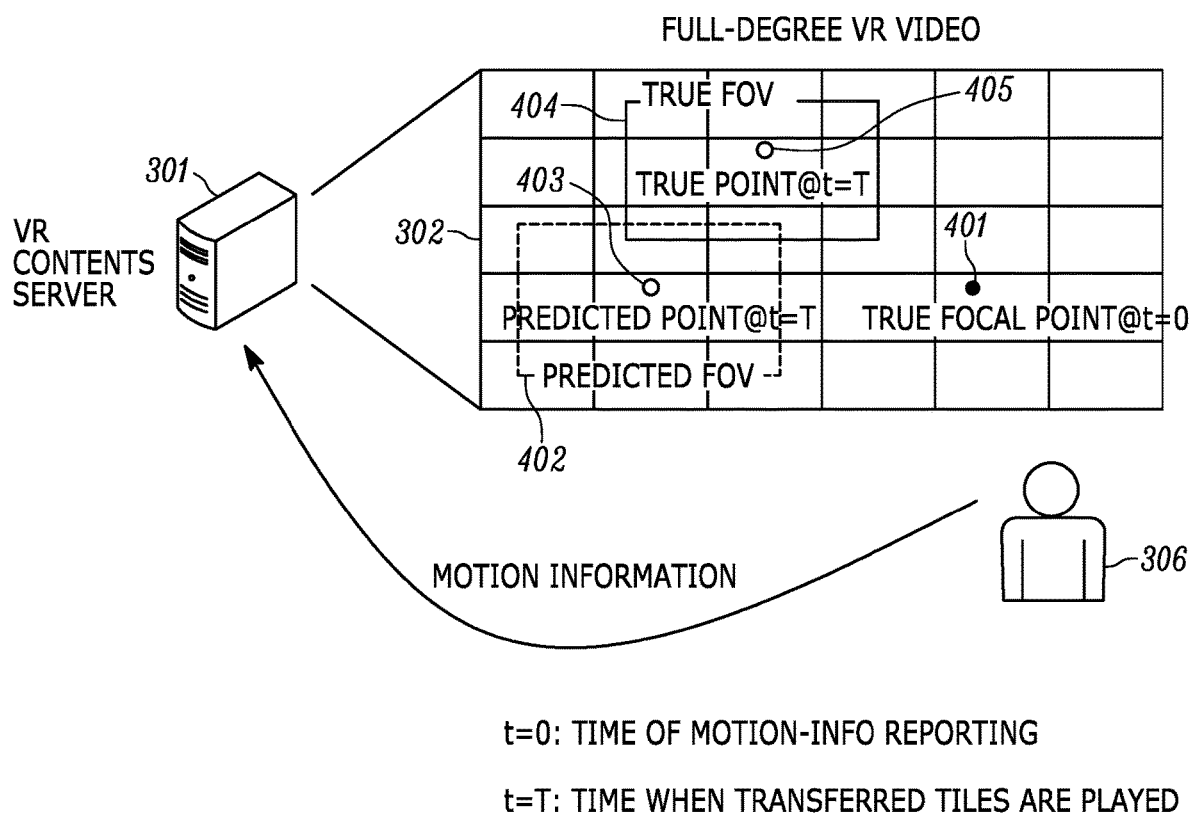
FIG. 4 shows the difference between a predicted FOV and a true FOV, if a user is in motion.

FIG. 4 shows the notional difference between a predicted FOV and a true FOV. Such a difference may occur while a user (or users head) is in motion. Methods for reducing bandwidth consumption may result in a low resolution tile may be displayed if there is a sufficiently large discrepancy between transmitted high resolution tiles and the actual FOV region at the time of image display. This situation may degrade the quality of a users experience. As MTP latency increases, the chance of a discrepancy also increases from inevitable network/buffering delays. Server 301 selects and sends a subset of tiles matching the users FOV at time t=0, when the users focal point is at point 401. Also at time t=0, a method of predicting a future FOV 402 may predict that the users focal point will be at point 403 at later time t=T. However, the user may act differently than predicted, and actually move to true FOV 404 with true focal point 405, between when the tiles are selected and the tiles are played (or displayed). The situation depicted in FIG. 4 thus shows the possibility of an inconsistency between transferred high-resolution tiles and the actual FOV when the tiles are played.

An issue highlighted by FIG. 4, and addressed herein, is more accurately predicting the future FOV tiles when server 301 streams VR video. Specifically, one issue is predicting a users future FOV when the time difference between the current and the future point is in the order of seconds. Systems and methods described herein may use a relatively long-term future FOV prediction method based on audio and/or video contextual information of video combined with individual user contextual information. Based on audio/video/user contextual weights, tiles that have a higher probability to be matched to a user's future FOV region may be sent with a high resolution, while the other tiles are sent with a low resolution. Systems and methods described herein use audio and/or video clues and estimate the location of audio and/or video sources in specific tiles in a video frame that may catch a user's attention, determine regions of interest and directions where a viewer may look, and encode those determined regions with higher quality tiles.

Figure 5:
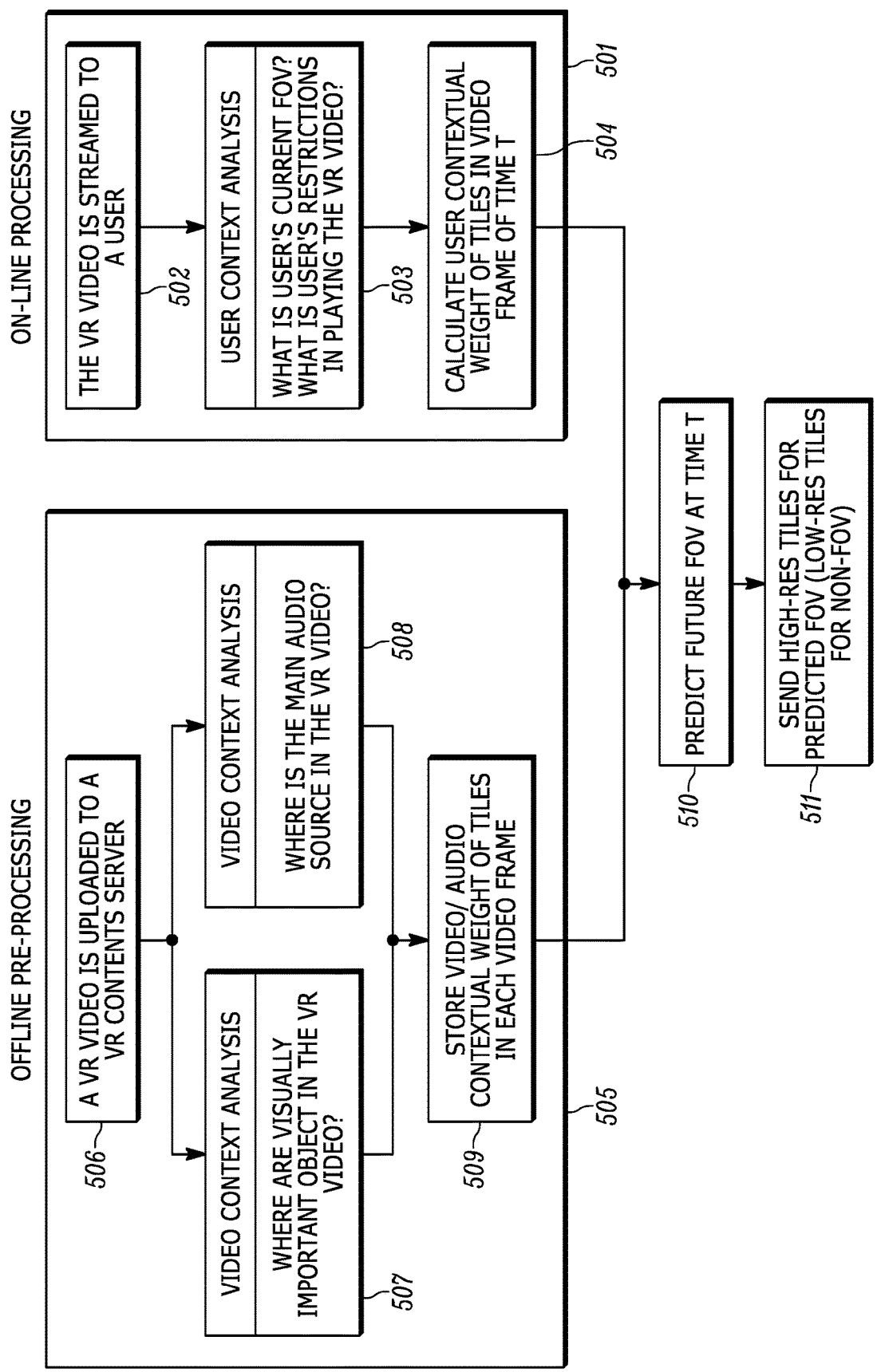
FIG. 5 is a flowchart for one embodiment of a method for calculating a future FOV prediction.

FIG. 5 shows a flowchart for one embodiment of a method for calculating a future FOV prediction, that includes both an on-line process 501 and an offline process 505. For the offline pre-processing of box 505, VR video is uploaded to a streaming server in box 506, and the server calculates and stores video and audio contextual weights of tiles in each video frame. Video context analysis is performed in box 507, and audio context analysis is performed in box 508. For example, video context analysis may include ascertaining where important objects may be in the video, and audio context analysis may include ascertaining where main audio sources are correspondingly positioned in the video. Calculated contextual weights are stored in box 509. For some embodiments, these video and audio contextual weights are based on the location in the VR video of visually significant objects and of the main audio source or relatively loud audio sources.

For some embodiments, after publishing (or streaming) the VR video to a user in box 502, a server predicts a users future focal point based on the users current FOV and user context analysis 503 (for example, a user's head movement). User context analysis may include ascertaining the user's current FOV and restrictions, such as whether the user is playing (or otherwise controlling) the field of view. A server calculates the region around the predicted focal point within which the true focal point is likely to exist (a wider region is set for longer latency), and derives the region within which FOV is likely to exist at the time of play. The server calculates a user weight of each tile within the FOV region at future time T, in box 504. Based on audio and video weights and on-line user weight information for each tile, the future FOV region at time T is calculated in box 510, and streamed with high resolution in box 511, while other tiles are streamed with lower resolution. For some embodiments, the audio and video weights are pre-stored, while the user weights are calculated real-time. For some embodiments, all of the audio, video, and user weights are calculated real-time. For some embodiments, some audio and video weights are pre-stored and others are calculated with user weights in real-time.

The above video, audio, and user weights reflect uniqueness of human interactions during VR experiences, such as following attractive video/audio objects and limitations of VR video playout environments. For some embodiments, based on a FOV region model and contextual weight model, the VR contents server selects the optimal video tiles to send with a high resolution. Video contextual weights are calculated for each video tile according to the existence of main visual objects within each tile. By classifying typical VR video types according to the existence of main visual objects and by using video analytics, the server may calculate video weights of each tile of a video frame. Audio contextual weights may be calculated for each video tile according to the existence of audio sources within each tile. If a VR video is embedding a known spatial audio file format, the server may calculate the location of sound sources for each video frame using the algorithms described herein. The user weights may be obtained dynamically from a users current FOV information and VR video playout environment, possibly including head-mounted display (HMD) motion.

Systems and methods described herein may reduce inconsistencies between transferred high resolution tiles and FOV at the time of play, while transferring a subset of tiles to reduce bandwidth consumption. A VR video streaming server, by analyzing a VR video's contextual information once uploaded, may predict user's future FOV during play, provide the best quality VR video streaming services, and minimize network resources. Systems and methods described herein may be used by push-based or pull-based video streaming models, or a combination. For an exemplary embodiment with a push-based streaming model, a server receives video client's current FOV and playout environment information in real-time, and determines high resolution tiles to push based on pre-calculated video/audio weights and real-time user weights. For an exemplary embodiment with a pull-based streaming model, a client receives video/audio contextual weights of a VR video file just before the video is being played. The client calculates and queries high resolution tiles based on the received weights and the users current FOV and playout environments.

Video quality may be determined based on bit rate, frame rate, and/or quantization parameter (QP). For some embodiments, tiles with higher quality may be encoded at a higher bit rate, a higher end resolution, higher frame rate, or a smaller QP. For some embodiments, tiles with lower quality may be encoded at a lower bit rate, a lower end resolution, lower frame rate, or a larger QP. For some embodiments, tiles may be encoded with a higher quality in a foveated rendering that targets a determined direction of view. Foveated imaging is a digital image processing technique in which the image resolution, or amount of detail, varies across the image according to one or more "fixation points." A fixation point indicates the highest resolution region of the image and corresponds to the center of the eye's retina, the fovea. Foveated imaging may also be referred to as space variant imaging or gaze contingent imaging.

Figure 6:
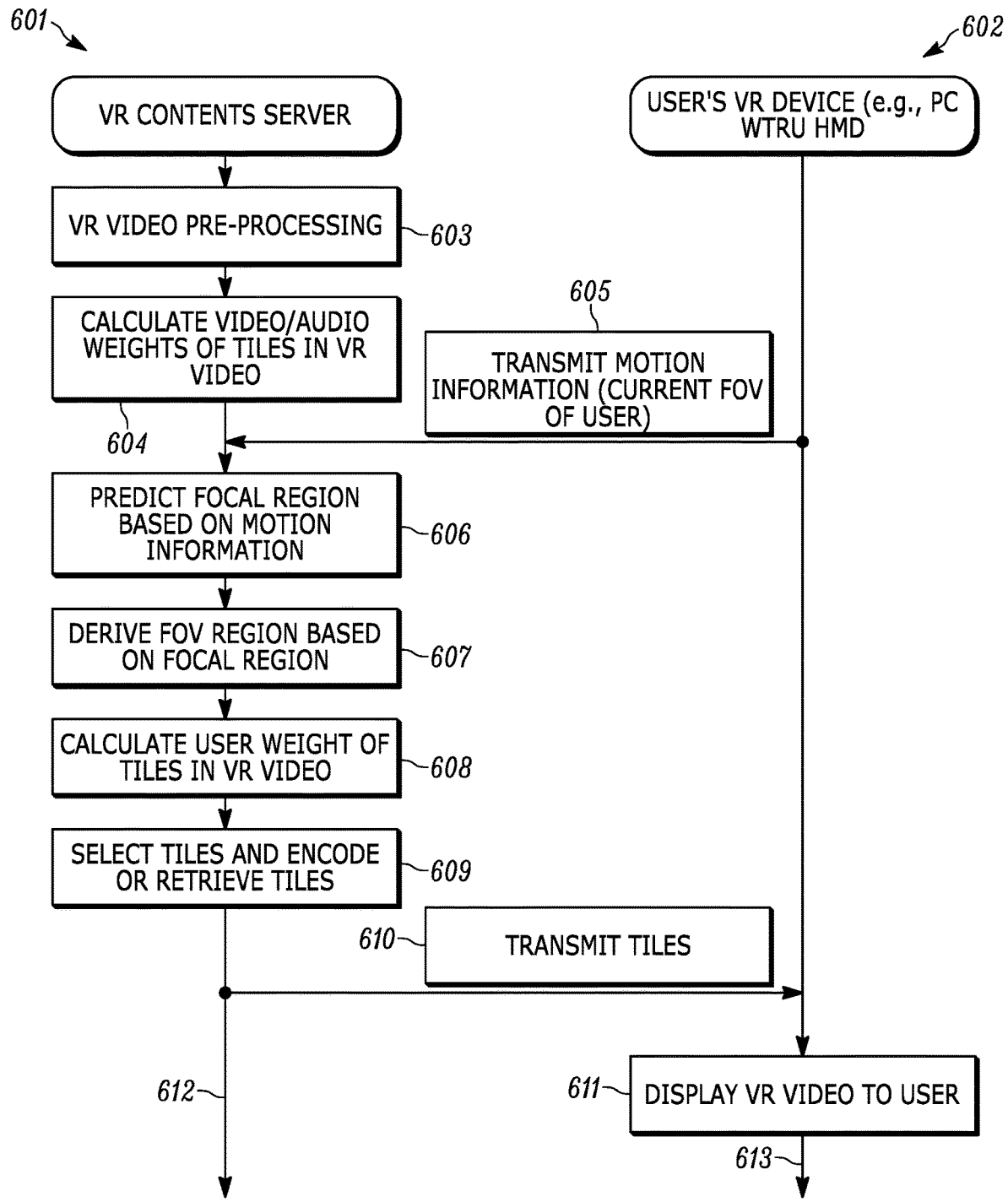
FIG. 6 is a message sequence diagram of an exemplary embodiment for calculating tile weights and selecting, encoding, and displaying VR video tiles for a push-based model.

FIG. 6 is a message sequence diagram of an exemplary embodiment for calculating tile weights and selecting, encoding, and displaying VR video tiles for a push-based model. For an exemplary embodiment, there are two sub-processes illustrated for a first temporal video segment: A server process 601 runs on a VR content server to generate video tiles, while a client process 602 runs on a users VR device, which may include a client computer, possibly a PC or game device, and a display. The display may be a mobile head-mounted display (HMD), that is coupled to the client computer either via a cable or wirelessly with a WLAN; the display may be a wireless transmit/receive unit (WTRU). VR video is pre-processed in box 603 and video and audio weights are calculated in box 604. For some embodiments, a users device submits a query and transmits motion information to a VR contents server for the current FOV of the user in box 605. For some embodiments, a VR contents server predicts focal region based on motion information in box 606 and derives a FOV region based on a focal region in box 607. User weights of VR video tiles are calculated in box 608, using audio contextual weights, video contextual weights, or a combination. Tiles are selected and encoded or retrieved by a VR contents server in box 609, transmitted to the user's device in box 610, and displayed to the user in box 611. The process repeats for the subsequent temporal segment of video as indicated by process flow continuations 612 and 613, and may iterate during the users VR experience. These processes are described in more detail below.

VR Contents Pre-Processing.

If a VR video file is uploaded to a VR video streaming server, a VR video server may pre-process the video file before publishing the file. For some embodiments, a server spatially splits each video frame into tiles and encodes each tile with multiple quality levels (for example, high, middle, low). For some embodiments, a server may dynamically encode each tile with variable resolutions upon request from a VR client device. For some embodiments, there is a tradeoff between processing delay and storage use, but systems and methods described herein work on top of a pre-processing variant. For some embodiments, a VR contents server calculates weights of tiles for each video frame. For some embodiments, the pre-calculated weight of a tile has two types: video and audio weights.

Video Contextual Weight.

For some embodiments, video contextual weights are derived based on visually significant objects within each video frame, which may be referred to as significant events. For some embodiments, specific tiles which comprise noticeable video context are identified as visually significant tiles. Specific objects may be marked as significant objects, and if a tile comprises a significant object, that tile may be designated as a high-weight tile for a video frame. For example, if the VR content is game content, tiles comprising main game character avatars, enemies, or significant creatures may have higher contextual weights. An embodiment of a method for obtaining video contextual weight is described below.

Audio Contextual Weight.

Attaining a high level of immersion into a virtual world may involve tricking a user's brain into believing what they are sensing. Sight may be limited to the field of view but sound adds to what sight lacks, such as a bull charging from behind, a rattlesnake to the side of a user, or a whisper moving from the left ear behind the head to the right ear.

Hence, content creators may use sound to direct the gaze of a user and effectively turn his head towards the sound source.

An audio contextual weight is the weight of each video tile based on the corresponding location of overlaid spatial audio sound sources within each video frame. Sounds may greatly affect human perception during VR video play. Most users naturally change the FOV toward the direction of a significant sound source. For some embodiments, if a certain video tile includes or is close to the corresponding direction of a sound source (i.e. associated with a significant audio event), that video tile may have a higher audio contextual weight than other tiles. There are multiple ways to embed spatial audio in VR video, and exemplary techniques for locating spatial audio sources in each video frame is discussed below. For some embodiments, video and audio contextual weights for each tile of a video frame are calculated and stored on a server.

Transmitting and Receiving Motion Information of User Device.

A user device which plays a VR video periodically sends motion information (e.g., head movement for VR HMDs or users mouse interaction for PCs) to a VR contents server. An HMD's motion information may be measured by built-in sensors, such as gyroscopes and accelerometers.

Predicting Focal Region and Deriving FOV Region.

A VR contents server receives sensor reports and calculates a users predicted future focal point if a newly-transferred video file chunk is played at the user device. Each time VR video chunks are transferred (e.g., every 1 sec if each video chunk is prepared in 1 second increments), a server calculates a prediction for the focal region and the FOV region. The focal region is the region within which the future focal point is expected to exist with a certain probability. The FOV region is the superset region of FOVs corresponding to each point of the focal region.

Figure 7:
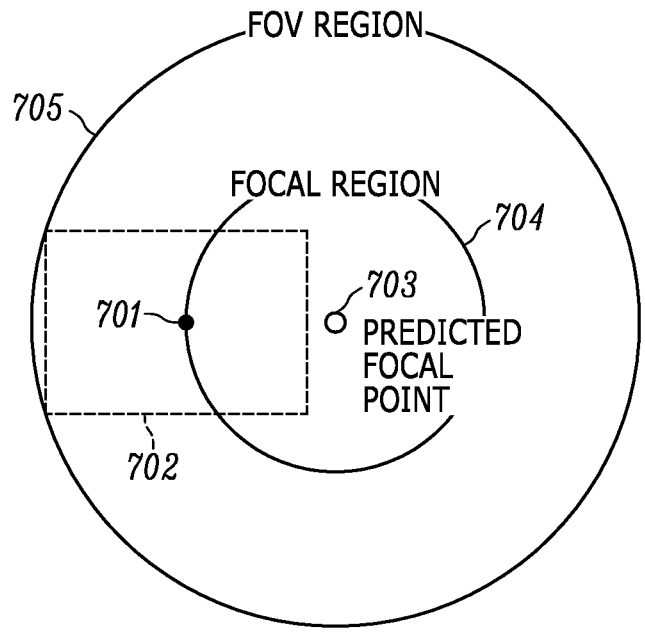
FIG. 7 is a schematic illustration of notional prediction error bounds for focal point and FOV regions.

FIG. 7 is a schematic illustration of notional prediction error bounds for focal point and FOV regions. A server may calculate a future focal point prediction based on motion information of the user and a uniform acceleration/velocity prediction model. A true focal point may exist randomly around the predicted point (e.g., due to the randomness of a user's head movement). Prediction error, which is the difference between the two points, may be a random process. For example, FIG. 7 shows a normal distribution with a variance that gets larger as network/buffering latency increases. If movement of a user's focal point is not biased toward a specific direction, the potential focal region may be shaped as a circle 704, centered on a predicted focal point 703. There may be equiangular likelihood of future motion, indicated by circle 704, as a region of uncertainty. FIG. 7 shows an exemplary FOV region 702 for one such possible focal point 701 on the left side of circle 704. Because FOV regions extend in distance outward from focal points, a trace of the bounds of FOV regions, swept along all possible focal points, produces FOV region circle 705.

That is, if the predicted focal point at a particular time, t, is focal point 703, and there is no bias for prediction error in any direction, there is a likely error bound illustrated by circle 704. An actual focal point can be located at any point on or within circle 704, and point 701 is an illustrated example. A FOV region extends in 2 dimensions about a focal point, and one example is FOV region 702. As all possible error points are considered, including point 701 tracing along the circumference of circle 704, the outer corners of FOV region 702 define FOV region circle 705. Any point within circle 705 is then a potential point within the true FOV when the prediction is made for predicted field of view point 703. That is, circle 705 defines a circular region around predicted focal point 703, showing a focal region prediction error between the prediction and the actual location. Using the focal region circle 704, a FOV region can be calculated as outer circle 705.

However, if the network transmission delay and the client's buffering delay (used for stable video playout on a client) are large, regions may be large enough to cover almost an entire video frame region. In that case, video/audio weights may become dominant terms for FOV prediction calculations. If network and buffering delays are small, the focal and FOV regions may be small enough to make the head prediction method affect FOV prediction calculations. Therefore, many embodiments of models described herein apply to various video delivery scenarios, such as a local server streaming case (small delay) and a remote server streaming case (long delay).

Calculating User Contextual Weights for Each Tile.

In some embodiments, a VR contents server calculates a weight of each tile within a FOV region. For many embodiments, a weight of a tile may be one or a combination of up to three types: audio, video, and user contextual weights. For some embodiments, audio and video weights are pre-calculated in a pre-processing step as constant values for each tile in video frame. To calculate a final user weight, a VR contents server determines a streaming client's device type, such as HMD, PC, or tablet. Based on the user client device type, user contextual weights may be different. A method for calculating user contextual weights is discussed below.

For some embodiments, a final weight of each video tile is derived by combining the above three weights. The final weight may be the output of a specific function func( ) which uses weights as input values, for example, perhaps a normalized weighted sum of the three inputs.

$$\text{Final Weight} = \text{func}(\text{Video Weight}, \text{Audio Weight}, \text{User Weight}) \qquad \text{Eq. 1}$$

Selecting and Encoding Tiles.

For some embodiments, a VR contents server selects a subset of tiles to send to the user with high resolutions. The server may select tiles having a higher Key Performance Indicator (KPI) value based on the final weight. For some embodiments, the KPI is the weighted sum of multiple elements: the final weight, available network bandwidth, users viewing environments, and users requested video resolutions. Other combinations of objective functions and constraints may be used for tile selection. For some embodiments, a server encodes selected tiles with a higher quality and non-selected tiles with a lower quality. The choice of an actual video resolution value for selected and unselected tiles may also be based on available network bandwidth for each VR user.

Selecting and Retrieving Tiles.

As an alternative to selecting and encoding tiles, a VR contents server may select tiles to send from stored, pre-encoded tiles. If VR video contents are pre-encoded for multiple quality levels upon upload, a contents server may select a high quality version for selected tiles and select a low quality version for the non-selected tiles. This method may reduce encoding time before sending out VR video frames to a client, and may use pre-processing and a larger storage space. For one embodiment, one method may select each tile's encoding resolutions based on calculated video, audio, and user contextual weights.

TABLE 1

Tile Resolution Selection Table Based on Measured Weights

| Case | Video Weight | Audio Weight | User Weight | Tile's Resolution Selection | Case Explanation for Many Embodiments |
|---|---|---|---|---|---|
| — | 0 | 0 | 0 | Lowest | No significant video/audio objects in this tile<br>User's future head direction does not include this tile |
| U | 0 | 0 | 1 | Mid | User's future head direction includes this tile |
| A | 0 | 1 | 0 | Mid | Significant audio object is in this tile |
| AU | 0 | 1 | 1 | High | Significant audio object is in this tile<br>User's future head direction includes this tile |
| V | 1 | 0 | 0 | Low | Significant video object is in this tile |
| VU | 1 | 0 | 1 | High | Significant video object is in this tile<br>User's future head position includes this tile |
| VA | 1 | 1 | 0 | High | Significant audio/video objects in this tile |
| VAU | 1 | 1 | 1 | Highest | Significant audio/video objects in this tile<br>User's future head direction includes this tile |

Table 1 shows one embodiment for how to choose a tile's resolution based on video, audio, and user weights. Other quality parameters may also be similarly chosen. For some embodiments, weights are expressed as only 0 or 1 values, though additional embodiments may use fractional values between 0 and 1. For example, for tiles that have all zero values for the three weights, a server may choose the lowest resolution because the tile has a very low probability that a user will actually see the tile. For a tile that has all 1 values for weights, the tile may have significant video/audio objects, and the tile may match a user's future head directions. Comparing the "A" and "V" cases in the table, a higher priority may be assigned to a tile having only audio objects than a tile having only video objects. For some embodiments, even if a users future head direction does not match a certain tile, it is probable that a user will turn his head towards the audio-sourced tile direction. But, a tile with only a visual object has a lower chance to attract a user's view if the tile does not match the future head direction. However, for the "AU" and "VU" cases, if there are significant video/audio objects in tiles matching a user's future head direction, those tiles may be similarly encoded with higher resolution for some embodiments. Based on the selected tile resolutions for each tile, a video frame for a certain time duration may be encoded as shown in the example of FIG. 8.

Figure 8:
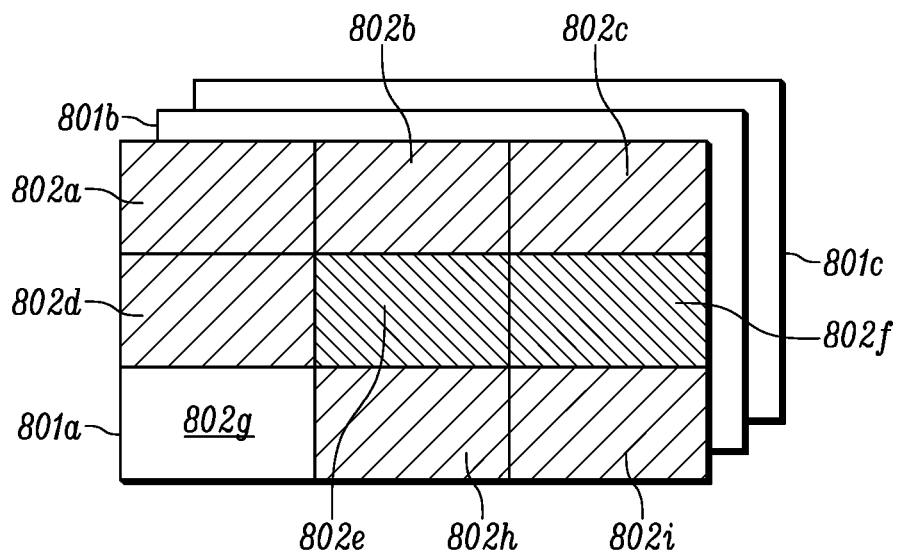
FIG. 8 is a schematic illustration of a map for video frame tile resolution requests.

FIG. 8 is one example of multiple video frames, each with tiles encoded with variable resolutions. For each of the three exemplary video frames (i.e., a plurality of temporal segments of video), identified as 801a-c, there are nine spatial regions. In the initial temporal segment 801a, nine exemplary tiles corresponding to spatial regions, are labeled as 802a-i. In one exemplary embodiment, tile 802g is the lowest quality tile, encoded with a resolution of 640×480; tiles 802a-d and 802h-i are encoded with a higher quality at 1024×768 resolution, and tiles 802e-f are encoded with the highest quality at 2048×1536. Other video quality measures, beyond just pixel resolution may also vary, such as bit rate, frame rate, and QP. Subsequent video frames 801b and 801c will have a similar subdivision of different resolution tiles, according to significant events occurring during those times. Additional detail on temporal factors among video segments, for example segments 801a-c, will be provided in the description of FIG. 25.

Displaying Tile Sets to a User.

A user device receives tiles and plays a corresponding video frame at play time. For one embodiment, if the user's FOV is within the received set of high-resolution tiles, the user has received all information used to display high-resolution video within the FOV. For one embodiment, if the users FOV is not within the received set of high-resolution tiles, at least some low-resolution information is displayed at the time of play.

Calculating Video Contextual Weights.

As mentioned previously, video contextual weights may be derived based on a visually significant object within each video frame. The visual object weight in VR video may be obtained by classifying the VR contents and calculating locations of main objects in each video frame. Multiple example scenarios can be described with FIG. 9.

Figure 9:
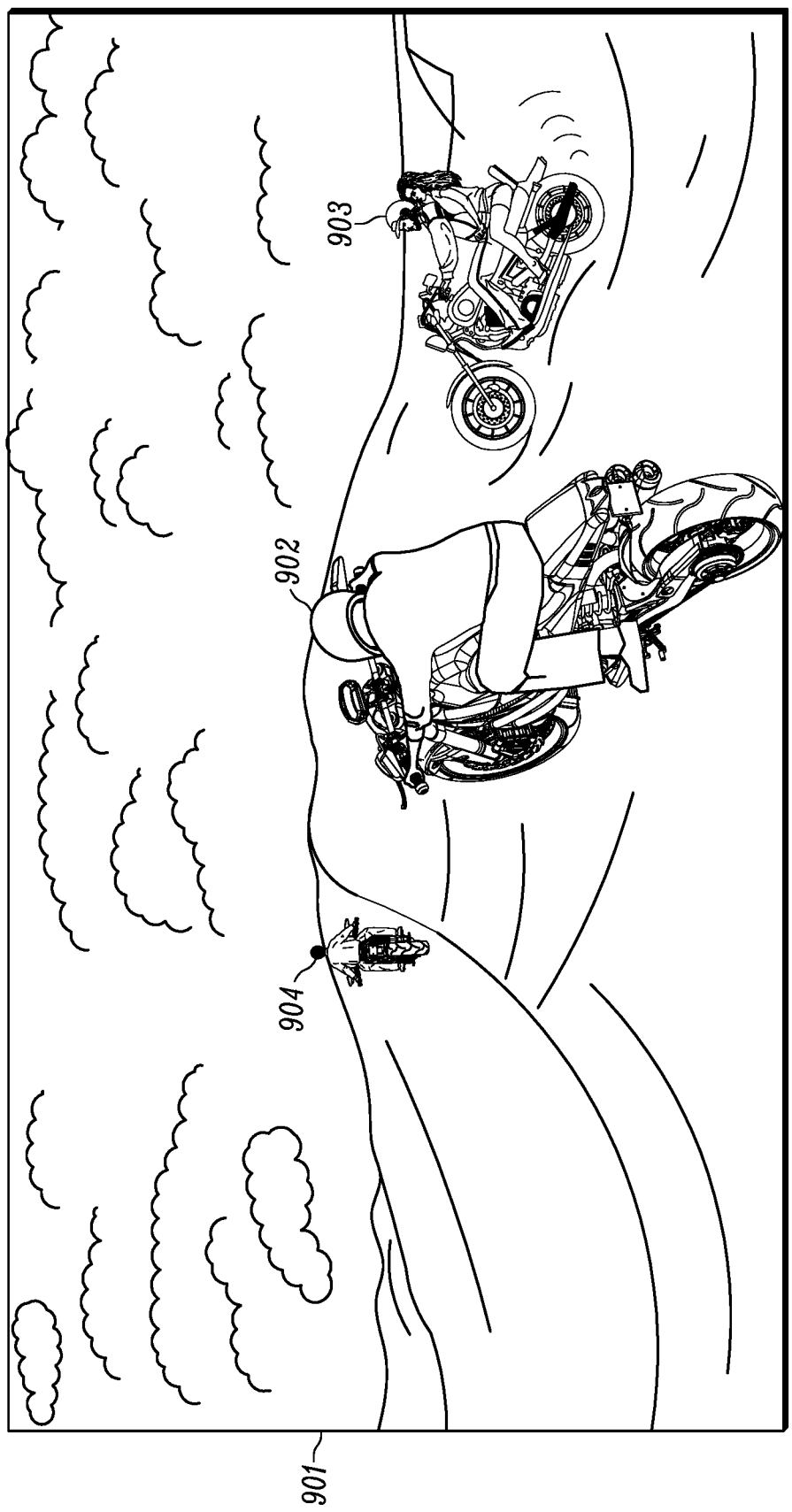
FIG. 9 is an example of a still image from a video having multiple main objects.

FIG. 9 is an example of a still image 901 from a video stream having multiple main objects 902-904, which may be avatars representing other players in a multi-player VR motorcycle racing game. This type of VR video content may be composed of an interaction with multiple main objects, such as a group of different players performances. For example, still image 901 may show a single point in time for a video game in which multiple participants are racing motorcycles in a VR world. In such an example, still image 901 may represent the FOV of one of at least four players. A second player is represented by avatar 902; a third player is represented by avatar 903; and the fourth player is represented by avatar 904. From this arrangement, it is easy to ascertain that the three other players may have FOVs with fewer main objects. For example, the player corresponding to avatar 903 may have a FOV containing two main objects, avatars 902 and 904. The player, corresponding to avatar 904 may have a FOV containing no main objects, instead just sand dunes. However that player may have audio clues that at least four other VR motorcycles are trailing. If still image 901 is from a real-time game, the main video objects might need to be ascertained in real-time; if still image 901 is from pre-recorded material, however, the main video objects may be pre-processed.

The arrangement of avatar video objects 902-904 in FIG. 9 may be used to explain the tile weightings of 802a-i in FIG. 8. In this example explanation, FIGS. 8 and 9 are described as related, although this is an optional interpretation of the figures. Correlating initial temporal segment 801a with still image 901, it can be seen that avatar 902 is within tile 802e, and since avatar 902 is large and may further have corresponding loud audio (from its VR proximity), it is a likely focal point for future views by the user. Avatar 903 is mostly within tile 802f, and since avatar 903 is also large and may further also have corresponding loud audio (from its VR proximity), it is also a likely focal point for future views by the user. Thus, tiles 802e and 802f will have higher quality, since they correspond with video and audio for avatars 902 and 903.

Avatar 904 is within tile 802a, but smaller (representing its greater distance in the VR world), and so will be sent with lower video quality than tiles 802e and 802f. Tiles 802b and 802c are within the possible trajectory of the player, who is viewing still image 901, and so are also possible future FOV locations. So these may be sent with elevated, although not the best, video quality. Tile 802i is nearby both avatars 902 and 903, and so may also have elevated video quality. The one region in still image 901 that is least likely to be the subject of the player's FOV is the bottom-left corner. There are no visual or audio objects there, and it is too late (in the VR world) for the player to steer to that location. Thus, corresponding tile 802g may be sent with the lowest resolution.

For many embodiments, VR content may have a range of main visual objects, from none to several, depending on the nature of the VR world. If multiple main visual objects are within the same tile, that tile may have a higher contextual weight than tiles that have only a single object, or none. While there may not be a dominant object in each video frame, tiles related to those objects may have higher contextual weights.

Some still imagery from a video may have no main objects, such as panoramic views from the top of high mountains. This type of VR video content may be composed of video frames that may be viewed almost equally by users. VR users may yet still focus on a certain direction of a view while there may be no main visual objects in each video frame. For such a situation, video contextual weights in each VR frame's tile may be distributed almost equally, and other contextual weights, such as audio or user contextual weights, may be dominant terms in calculations of a user's predicted FOV.

For many embodiments, VR video contents may be classified as one of the above types or a mixed-type according to each time portion of a video. For example, a 1-minute VR video may start with scenery views, with no main visual objects, but become a single object-type as time elapses. Therefore, each video frame may be visually analyzed and main objects may be classified based on video content analysis methods such as object detection, facial recognition, motion detection, and the like.

Calculating Audio Contextual Weights.

Figure 10:
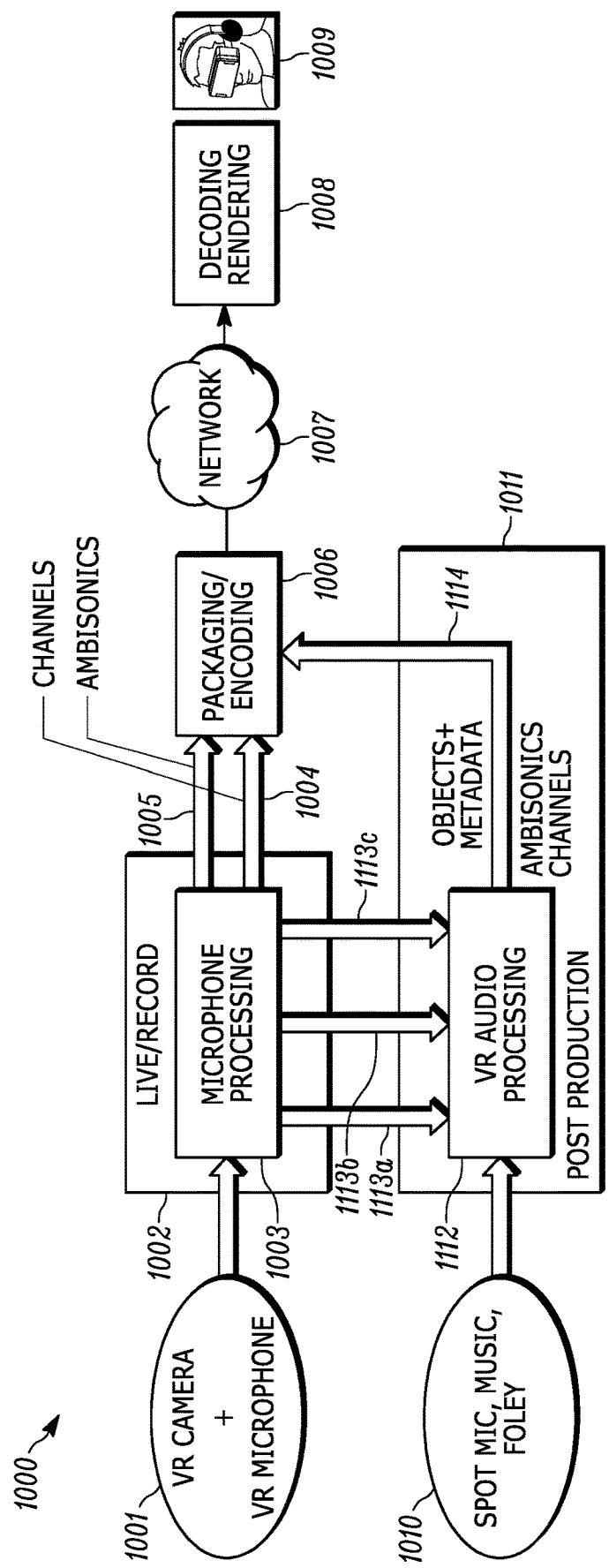
FIG. 10 is a block diagram of an exemplary workflow for content creation and delivery of VR data.

FIG. 10 is a block diagram 1000 of an exemplary workflow for content creation and delivery of VR data, including audio data workflows. By using VR cameras and microphones 1001, 360-degree video and audio contents may be captured by recording process 1002. For many embodiments, audio and video data is recorded and data undergoes microphone processing in box 1003. 360 audio data (such as Ambisonics audio) and channel audio data is sent via Ambisonics channels 1004 and 1005 for packaging and encoding in process box 1006. Spot microphones, music, and Foley effects data 1010 for post-production block 1011 may be combined with microphone processed data in VR audio processing block 1112 via channels 1113a-c. Post-production objects with metadata, 360 audio (e.g. Ambisonics), and channel data is also sent via channel 1114 for packaging and encoding in process box 1006. Packaged and encoded data is transmitted over a network 1007 for decoding and rendering in process 1008 and play on a user device 1009.

For many embodiments, after microphone processing, audio signals, including 360-degree audio signals, may be produced using one or more different spatial audio formats. Examples of spatial audio formats include object-based, Ambisonics-based, and channel-based formats as shown in Table 2.

TABLE 2

| Spatial Audio Formats | |
| --- | --- |
| VR Audio Format | Descriptions of Embodiments |
| Object-based | Audio elements with positional metadata Direct rendered to target speaker layout or headphones |
| Ambisonics-based | First-order Ambisonics Higher-order Ambisonics |
| Channel-based | Mixes of microphone array recordings for a specific loudspeaker layout Stereo, 5.1 channel, 7.1 channel |

For some embodiments, an object-based VR audio format may be used for audio elements with positional metadata and for direct rendering to target speaker or headphone layout. For some embodiments, Ambisonics-based VR audio format may be used with first-order or higher-order Ambisonics. For some embodiments, channel-based VR audio formats may be used with mixes of microphone array recordings for a specific loudspeaker layout, a stereo layout, a 5.1 channel layout, or a 7.1 channel layout.

Various different VR audio production file formats may be used to store 3-dimensional audio data for an immersive VR experience. One such spatial audio file format is FoA (First-order Ambisonics). If a user uploads a VR video with a spatial audio file format, a VR video server may calculate audio weights for each video tile as described below.

Localizing Audio Sources in 360 Video.

Figure 11:
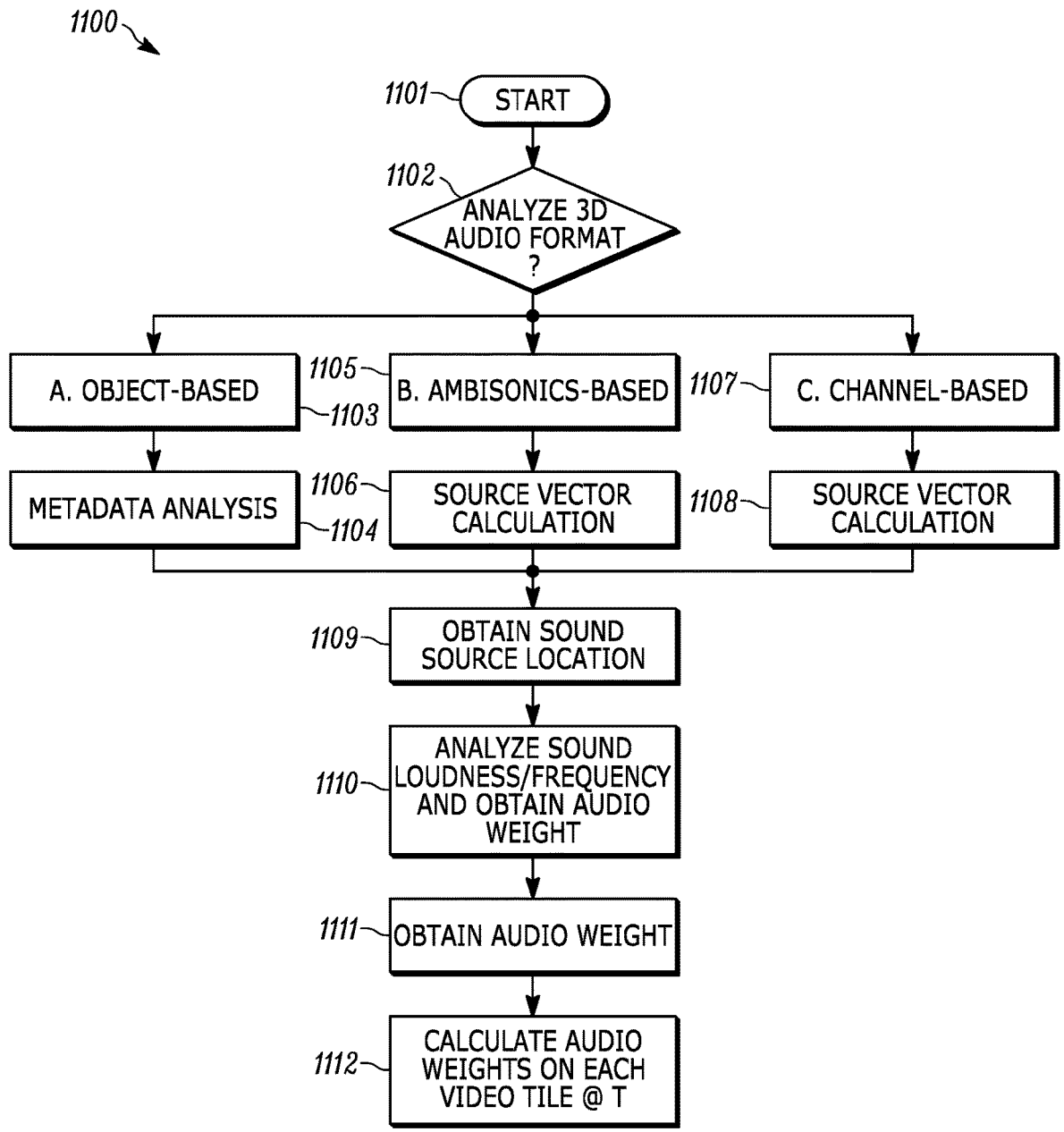
FIG. 11 is a flowchart of an exemplary embodiment of a process for calculating audio contextual weights.

FIG. 11 is a flowchart 1100 of an exemplary embodiment of a process for calculating audio contextual weights. For one embodiment, starting in box 1101, a VR server analyzes three-dimensional (3D) audio file format data in box 1102 that a content creator may produce. Based on the detected 3D audio file format, the location of audio sources within each video frame may be calculated by one of the embodiments described below. Object-based data undergoes an object based analysis 1103 that includes a metadata analysis in box 1104. Ambisonics- and channel-based data undergoes an Ambisonics-based analysis 1105 that may use source vector calculations in box 1106, or a channel-based analysis 1107 that may use source vector calculations in box 1108. Sound source locations may be determined in box 1109 and sounds are analyzed for loudness and frequency in box 1110. This permits audio weights to be determined in box 1111, performed for each video tile at a particular time, as indicated in box 1112.

Object-Based 3D Audio Representation Case.

Object based sound content is becoming prevalent in the cinema and home theater environments, which deliver immersive audio experiences. Such an environment may be well fitted to VR sound where precision of apparent sound location is used for complete immersion in a virtual world. VR content creators create object-based sound in 3D space and encode the content for delivery, decoding, and rendering binaurally (on headphones) and over speakers for an end user.

A spatial sound scene may be described by a number of virtual sources (or sound objects), each positioned at a certain target object position in space. In contrast to the concept of channels, these object positions may be independent from the locations of available speakers, and varying over time for moving objects, such as a plane flying by over the head of a listener. Because object positions may not coincide with loudspeaker positions, object signals may be rendered to their target positions. From a data point of view, objects have object waveform(s) and associated metadata (such as object position and gain). For many embodiments, an audio rendering engine in a playback device reads the associated metadata to map the audio track to headphones or a speaker combination, to achieve the desired spatial effect.

Figure 12:
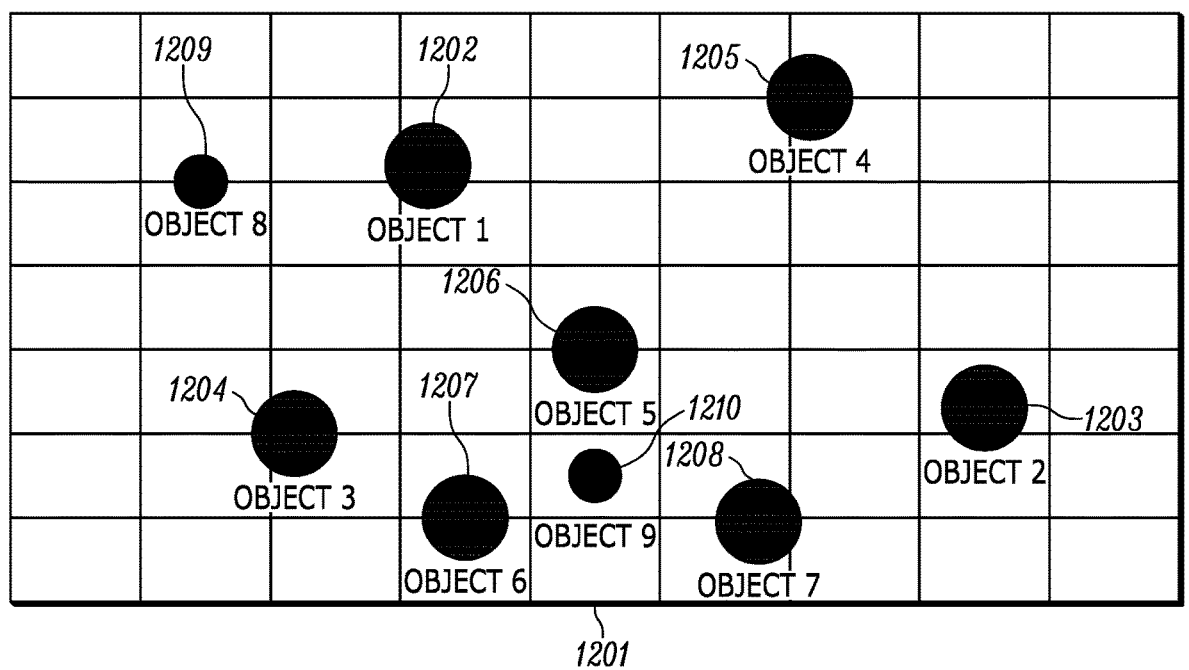
FIG. 12 illustrates audio sources and object locations.

FIG. 12 illustrates exemplary audio sources and object locations in a two-dimensional view of VR video tiles in a video frame 1201. An object position is a coordinate in 3D space that may be retrieved from metadata. For some embodiments, the position of each dynamic object is specified using 3D coordinates within a normalized, rectangular room. The position data may be used to render an object with a high degree of spatial accuracy. For each video frame, metadata of audio objects is used to find the corresponding location of audio sources in each tile. FIG. 12 illustrates nine sound objects, 1202-1210, for exemplary video frame 1201. Their locations 3D coordinates may be retrieved from metadata and mapped to the tiles of video frame 1201, including a 360 VR video frame, as shown in FIG. 12. The exemplary mapped tiles thus include sound source objects.

Ambisonics-Based 3D Audio Representation Case.

An Ambisonics system may be referred to as "scene-based audio." Ambisonic audio data is a physical description of sound pressure waves as a function of space and time. Such data is useful for sound capture in live sports and user-generated content (UGC) applications. Ambisonic audio data provides high spatial accuracy with compact microphone configurations while providing for relatively easy manipulation and rotation.

Figure 13:
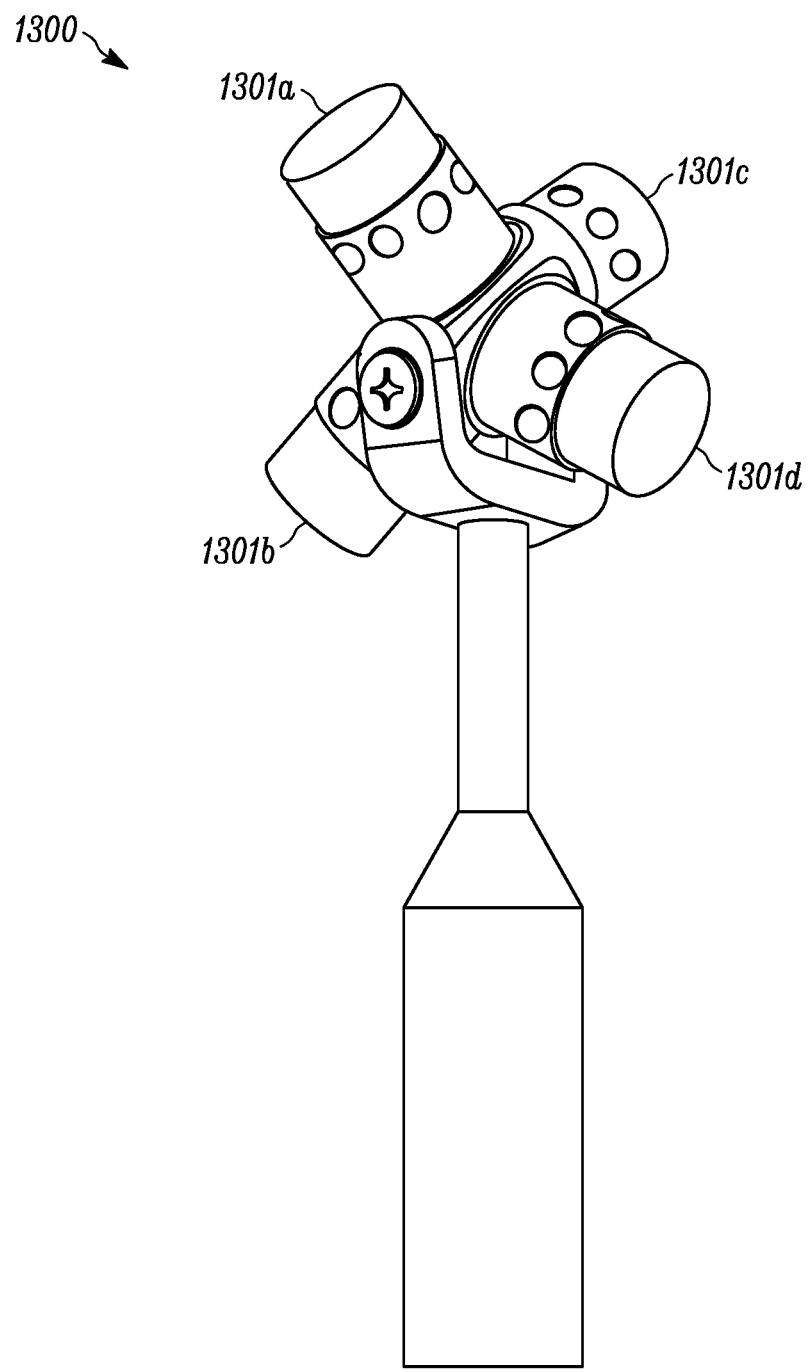
FIG. 13 is an illustration of an example three-dimensional (3D) Ambisonic microphone.

FIG. 13 is an illustration of an example Ambisonics microphone 1300, having a set of multiple individual directional microphones, with microphones 1301a-d being visible. Based on the audio response patterns of the individual directional microphones, different numbers may be used so that, when the audio responses are combined, the aggregated response is effectively omnidirectional (i.e., having a spherical aggregated response pattern).

Figure 14:
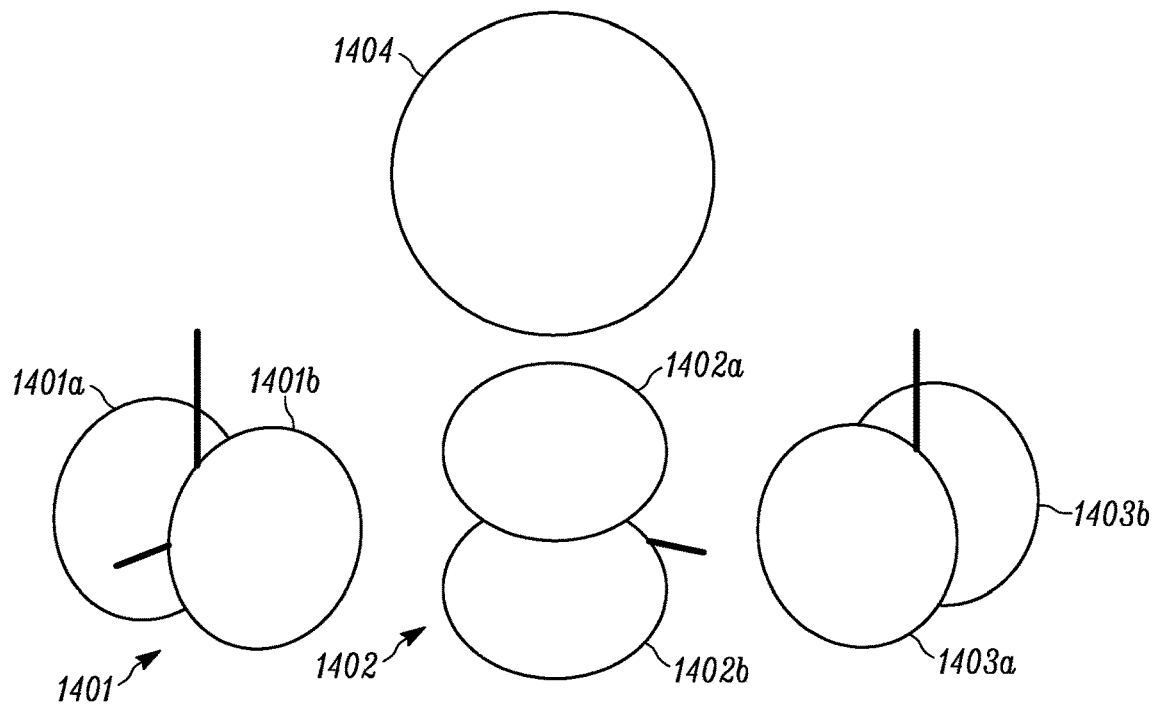
FIG. 14 is an example set of graphs showing the axial patterns of the Ambisonics signal components and a combined spherical response.

FIG. 14 is an example set of graphs showing the first order axial patterns of exemplary Ambisonics signal components, which may be combined to form an approximately spherical aggregate pattern. Plot 1401 illustrates two response patterns 1401a and 1401b that may be obtained from a first pair of oppositely-oriented individual directional microphones. Plot 1402 illustrates two response patterns 1402a and 1402b that may be obtained from a second pair of oppositely-oriented individual directional microphones that is disposed in an orthogonal direction from the first pair. Plot 1403 illustrates two response patterns 1403a and 1403b that may be obtained from a third pair of oppositely-oriented individual directional microphones that is disposed in the remaining direction that is orthogonal to both the first and second pairs of microphones. Coherently combining the audio signals collected from these three pairs produces a system aggregated audio response pattern 1404 that is illustrated as approximately spherical.

Ambisonic signals comprise a spherical harmonic decomposition of a sound field. They correspond to a sound pressure W(t), and the three components of the pressure gradient X(t), Y(t), and Z(t) at a particular point. Together, these signals approximate the sound field on a sphere around the microphone. W(t) (the mono signal) is the zero-order information, corresponding to a constant function on the sphere, while the X(t), Y(t), and Z(t) terms are the first-order terms (the dipoles or figures-of-eight). This first-order Ambisonics format (which is the YouTube 360's current spatial audio format) is a first-order approximation of the overall sound field. Higher order Ambisonics may use more speakers for playback but increase spatial resolution. First order Ambisonics signals yield an estimate of sound sources measured at the center point of a microphone array, where W(t) is an estimate of total sound pressure and X(t), Y(t), and Z(t) terms are estimated components of a sound intensity vector.

Ambisonic signals (called B-format signals) may be derived from an Ambisonic microphone's captured signal format (called A-format signals). A single Ambisonics microphone (as shown in FIG. 13) may be used to pick-up A-format signals. One embodiment of such a microphone has four capsules to pick up the sound in the directions of left-front (LF), right-front (RF), left-back (LB), and right-back (RB). After recording A-format signals, B-format signals may be derived using the following equations:

$$X(t)=0.5((LF-LB)+(RF-RB)) \qquad \text{Eq. 2}$$

$$Y(t)=0.5((LF-RB)-(RF-LB)) \qquad \text{Eq. 3}$$

$$Z(t)=0.5((LF-LB)-(RF-LB)) \qquad \text{Eq. 4}$$

$$W(t)=0.5((LF+LB)+(RF+RB)), \qquad \text{Eq. 5}$$

where X(t), Y(t), Z(t) and W(t) are B-format signals, and LF, RF, LB, and RB correspond to the signals recorded by the individual directional microphone capsules at the left-front, right-front, left-back and right-back locations, respectively.

With a main single sound source, the encoding equations of B-format signals may be expressed as:

$$X(t)=\cos \alpha \cdot \cos \beta \cdot s(t) \qquad \text{Eq. 6}$$

$$Y(t)=\sin \alpha \cdot \cos \beta \cdot s(t) \qquad \text{Eq. 7}$$

$$Z(t)=\sin \beta \cdot s(t) \qquad \text{Eq. 8}$$

$$W(t)=(1/\sqrt{2}) \cdot s(t) \qquad \text{Eq. 9}$$

where $\alpha$ represents the azimuth angle of the source, $\beta$ represents the elevation angle of the source, and s(t) represents the weight of the sound signal.

Figure 15:
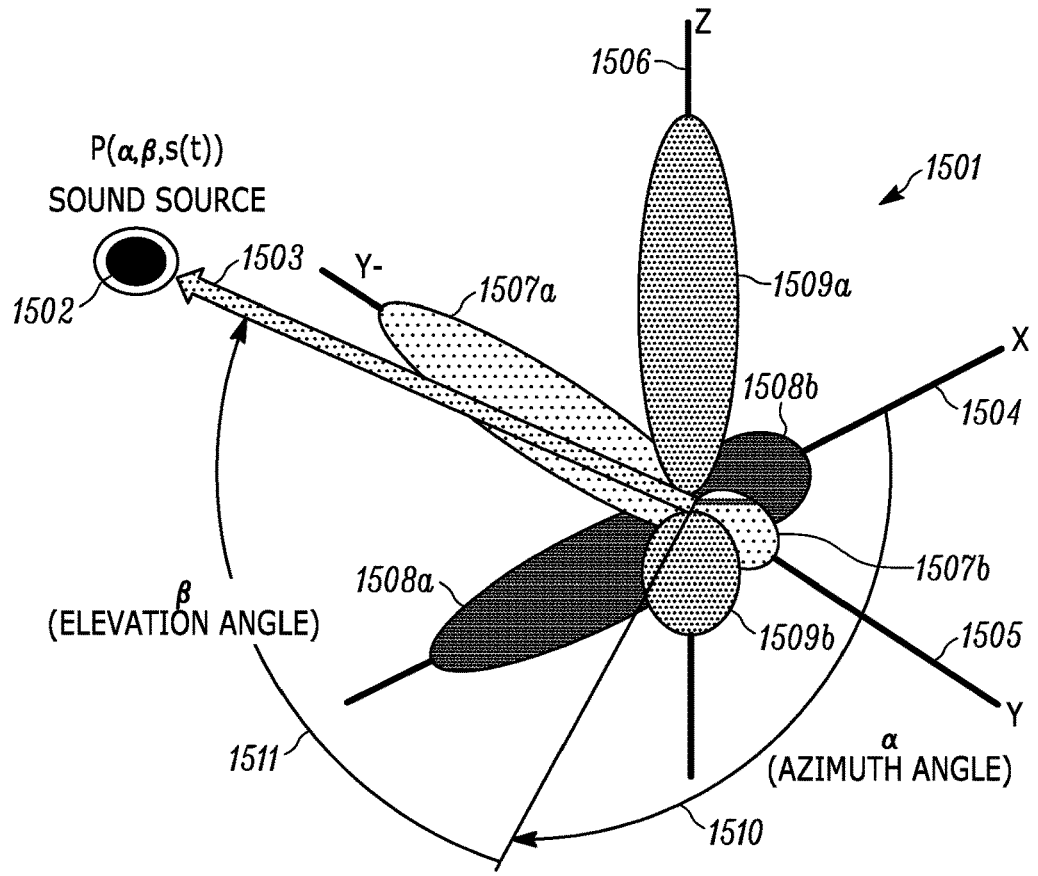
FIG. 15 is a 3D plot of an example sound source vector and calculation of Ambisonics sound components.

FIG. 15 is a 3D plot 1501 of an example sound source 1502 and sound source vector 1503 calculated using Ambisonics sound components. The B-format signals expressed above are shown in the graph of FIG. 15. A source vector calculation is a sound source localization algorithm used with the first-order Ambisonic data format. Using the first order Ambisonics signals, the DoA (Degree-of-Arrival) may be estimated by an inverse intensity vector approach. As the intensity vector indicates the magnitude and the direction of the acoustical energy from a sound source, the inverse direction may be used directly as a DoA estimate. If the spatial audio format is Ambisonics, for each VR video frame, the dominant sound source location may be determined using the following equations:

$$s(t)=\sqrt{2} \cdot W(t) \qquad \text{Eq. 10}$$

$$\beta=\arcsin(Z(t)/s(t)) \qquad \text{Eq. 11}$$

$$\alpha=\arccos X(t)/\cos \beta \cdot s(t) \text{ or} \qquad \text{Eq. 12}$$

$$\alpha=\arcsin Y(t)/\cos \beta \cdot s(t) \qquad \text{Eq. 13}$$

Therefore, by calculating vector P(α, β, and s(t)) from the delivered W(t), X(t), Y(t), and Z(t), the sound source location in each video frame may be obtained using an Ambisonics file format.

In the illustrated graph 1501, there are three axes: x-axis 1504, y-axis 1505, and z-axis 1506. Due to the position of sound source 1502, sound intensity along the negative direction of y-axis 1505 is higher, indicated by audio response lobe 1507*a*, than the sound intensity in the opposite direction, indicated by audio response lobe 1507*b* along the positive direction of y-axis 1505. The position of sound source 1502 affects the audio response lobes aligned with the opposing directions of the x-axis 1504 and z-axis 1506, as illustrated by audio response lobes 1508*a-b* and 1509*a-b*.

Channel-Based 3D Audio Representation Case.

One common way of representing spatial audio is with a set of waveforms, called channel signals, where each signal is designated for a speaker in a specific position relative to a listener. Channel-based spatial audio formats, such as 2.0 (two-channel stereo) and 5.1 (multi-channel sound), may be used for speaker configurations. Three-dimensional loudspeaker setups may include a varying number of height speakers, such as the 7.1, 9.1, and 22.2 channel formats.

Figure 16:
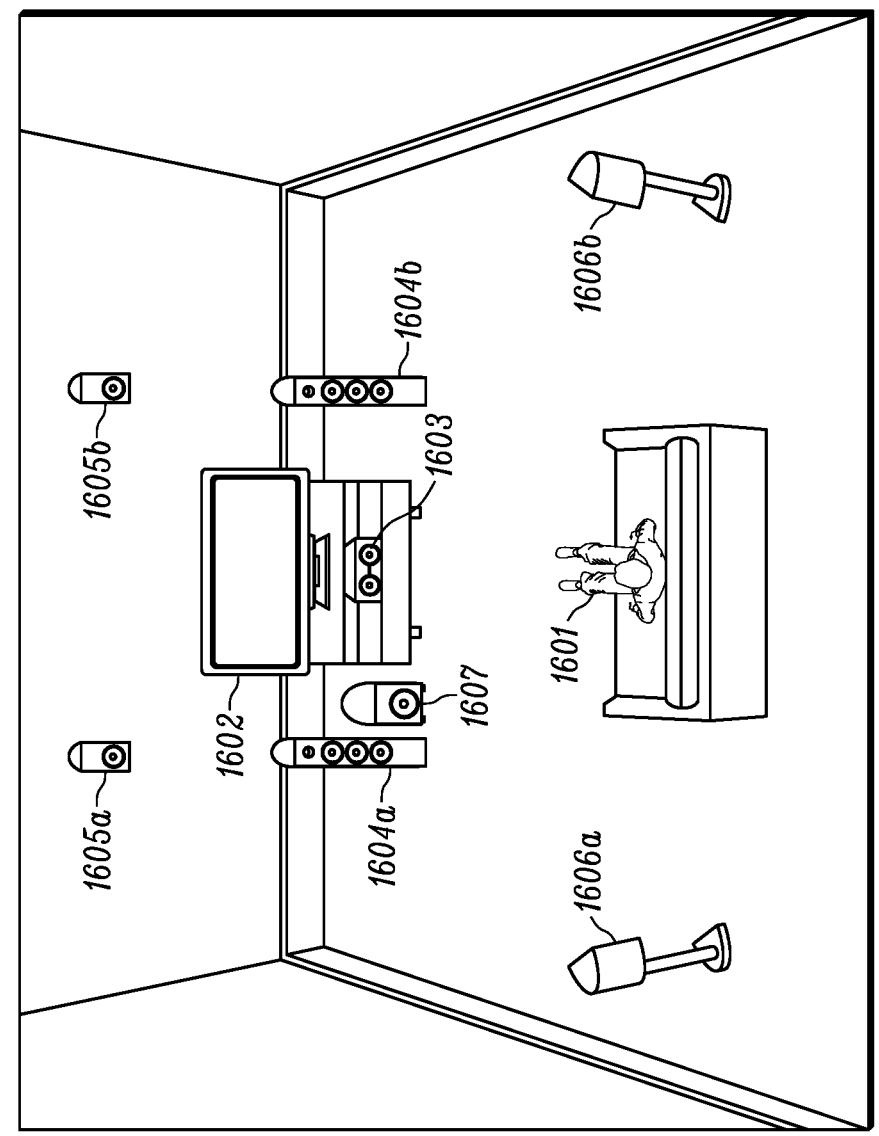
FIG. 16 is a perspective view of an example 7-channel microphone placement in a room.
Figure 17:
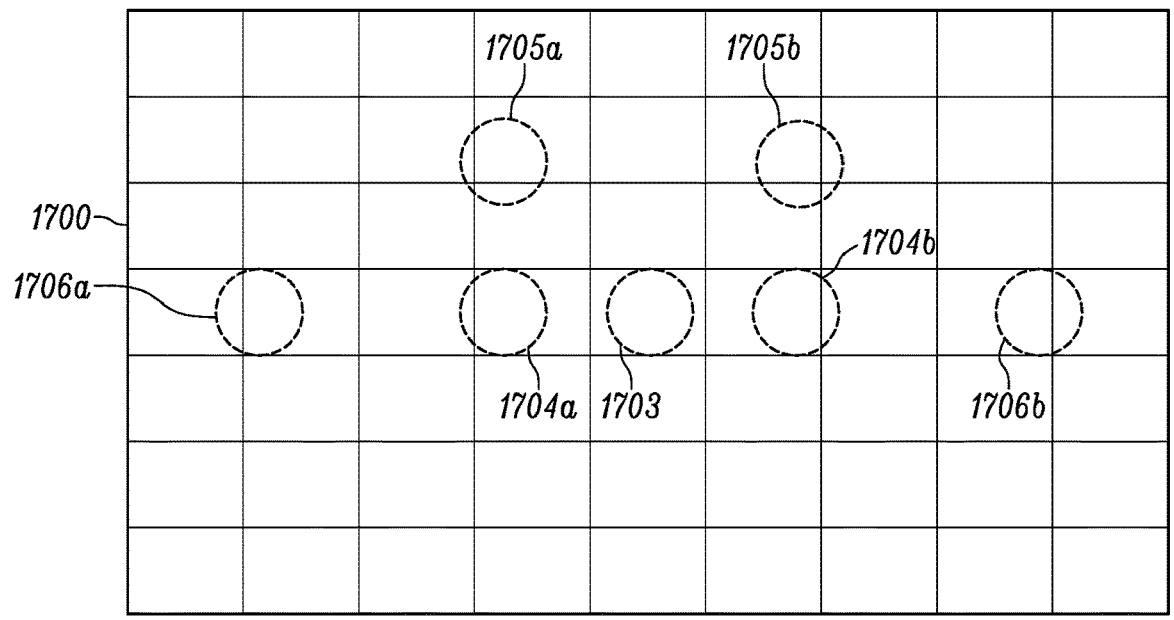
FIG. 17 is an example VR video tile layout showing corresponding locations for a 7-channel microphone.

FIG. 16 is a perspective view of an example 7-channel speaker placement arrangement 1600 in a room, and FIG. 17 is a VR video tile layout 1700 showing the locations in video tile layout 1700 for the 7-channel arrangement 1600. FIGS. 16 and 17 should be viewed together.

For this example embodiment, the listener 1601 is sitting on a couch in the lower center of FIG. 16. Two speakers are placed directly to the left and right of the listener, designated 1606*a* and 1606*b*. Two speakers are placed across the room and designated 1604*a* and 1604*b*. Two more speakers are mounted on the wall across the room from listener 1601 and designated 1605*a* and 1605*b*. One more speaker is located under a video display 1602 in the center of the room and is designated 1603, and a subwoofer is designated 1607.

The 3D locations of these speakers are mapped to video tiles in FIG. 17. A temporal segment is made available to provide a VR simulation of the experience of listener 1601, through video tile layout 1700. The FOV of listener 1601 may be anywhere within video tile layout 1700. The position of center speaker 1603 maps to indicated position 1703; the positions speakers 1604*a* and 1604*b* map to positions 1704*a* and 1704*b*, respectively. The positions of speakers 1605*a* and 1605*b* map to positions 1705*a* and 1705*b*, respectively, while the positions of speakers 1606*a* and 1606*b* map to positions 1706*a* and 1706*b*, respectively. Because human hearing response is not able to ascertain directional information for low frequency sounds as well as it can for high frequency sounds, there is no position that is illustrated as mapped for subwoofer 1607.

If channel-based 3D spatial audio streams are embedded in VR video content, each video frame's sound source location may be calculated as described below. For each sound source, a sound wave may be transmitted to each loudspeaker channel using vector based amplitude panning as described in, for example, *Vector Based Amplitude Panning*, 45 J. AUDIO ENG. SOC. 456-466 (June 1997), available at http://lib.tkk.fi/Diss/2001/isbn9512255324/article1.pdf.

Vector based amplitude panning is a technique for panning a sound source in 3D space using multiple speakers. In this technique, speaker position and sound source position is given by vectors.

Figure 18:
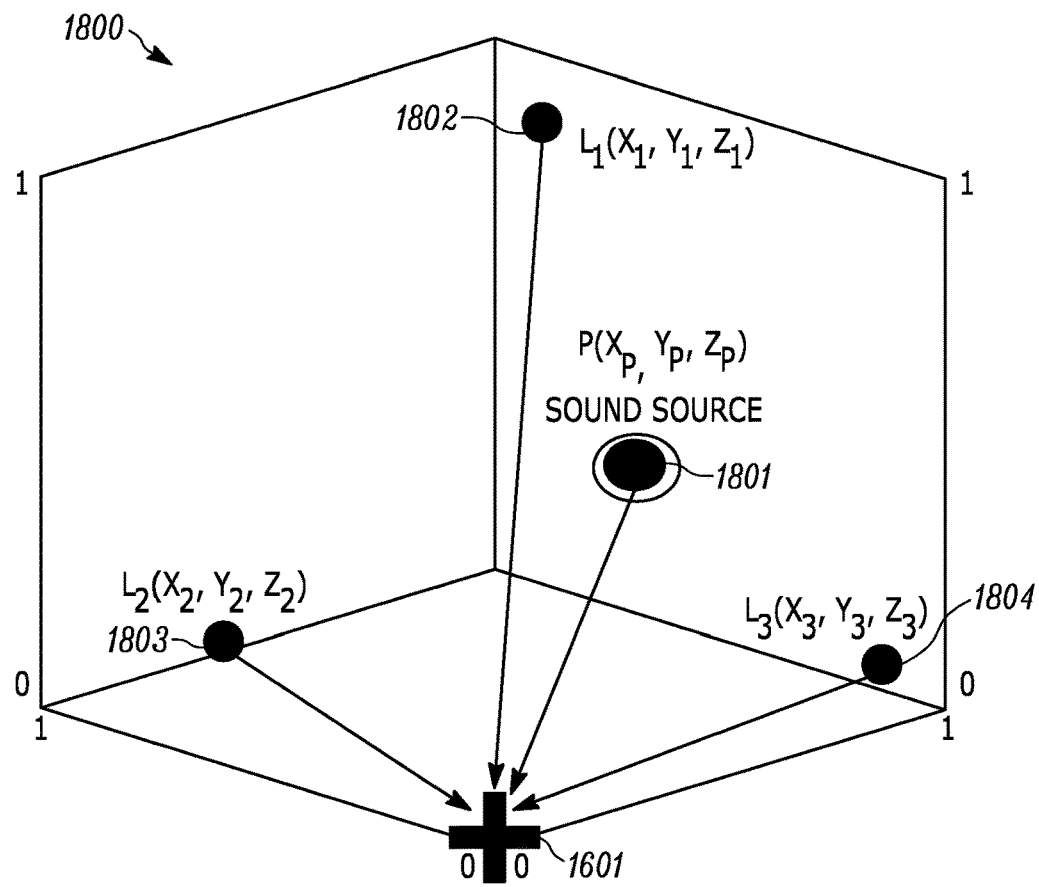
FIG. 18 is a 3D plot of an example sound source in relation to a listener and three example loudspeaker locations.

FIG. 18 is a 3D plot 1800 of an example sound source 1801 in relation to listener 1601 at position (0, 0, 0) and three example loudspeakers 1802-1804 at differing locations. The zero location of the coordinate system, (0, 0, 0) is set as positioner of listener 1601, as shown in FIG. 18. The configuration of FIG. 18 may be used for locating a sound source with channel-based VR audio. For many embodiments, the listener is located at position (0, 0, 0) and loudspeaker locations are set based on standard locations or configurations received with an audio file, along with respective sound gain values for each channel. Tiles containing audio sources may be prioritized for high resolution.

For the example embodiment of FIG. 18, $L_1(x_1, y_1, z_1)$, $L_2(x_2, y_2, z_2)$, and $L_3(x_3, y_3, z_3)$ are vectors which point to position of each of three speakers, respectively 1802, 1803, and 1804, while $P(x_p, y_p, z_p)$ is a vector which points from the origin to sound source 1801. For this embodiment, the signal may appear coming from point P, if each speaker has a gain that corresponds to its position in a 3D Cartesian coordinate system. Each speaker has a contribution to the sound field according to its position. For this embodiment, the gain for each speaker, $G(g_1, g_2, g_3)$, may be calculated using vectors.

If VR video is used with the channel based spatial audio format, the location of the sound source $P(x_p, y_p, z_p)$ is an unknown location while the location of loud speakers $L_{1 \ldots n}$ and gains $G(g_1, g_2, g_3)$ of each speaker at each video frame epoch are given. With the location of each loud speaker channel configuration $L_{1 \ldots n}$ and gains for each channel, G, the VR contents server may estimate major sound source location on each video frame by using the following equations:

$$P = g_1 L_1 + g_2 L_2 + \ldots + g_n L_n \qquad \text{Eq. 14}$$

$$P^T = G L_{1 \ldots n} \qquad \text{Eq. 15}$$

Figure 19:
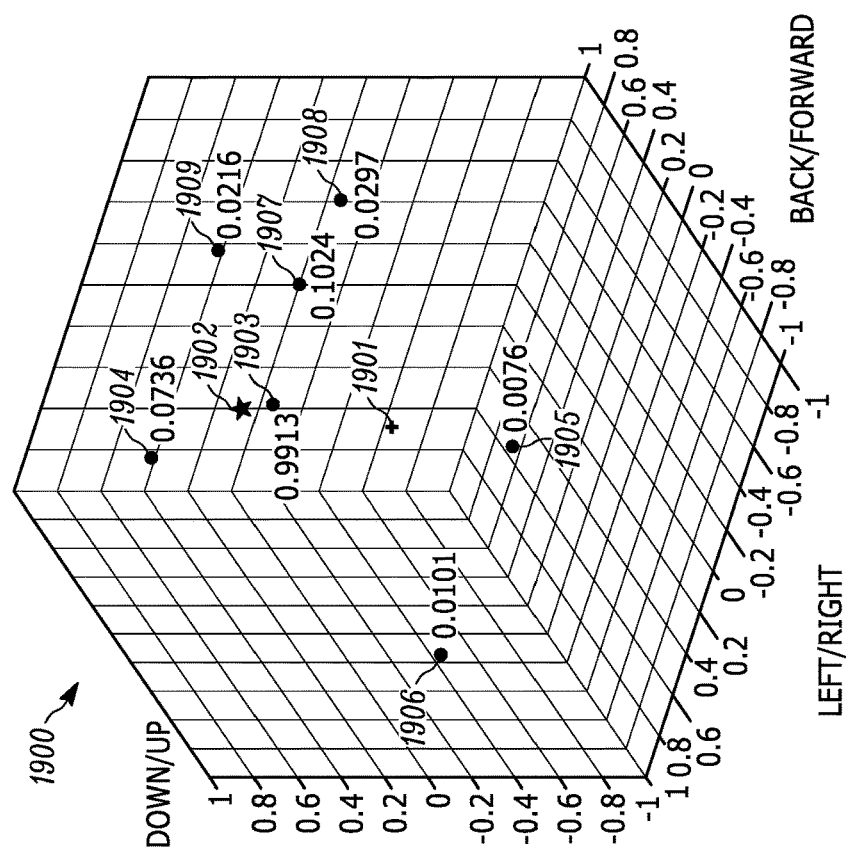
FIG. 19 is a 3D plot of loudspeaker weights and sound source locations for a 7-channel example.

FIG. 19 is a 3D plot 1900 of loudspeaker weights and sound source locations for a 7-channel example. For FIG. 19, the listener is shown in the center of the coordinate system at (0, 0, 0) with a plus ("+") at listener location 1901. A single sound source is shown as a star in the top center of the coordinate system at sound source location 1902, located at that will be calculated shortly. Loudspeakers 1903-1909 are shown at indicated positions, along with their associated sound weights.

Each numeric value is a sound weight for each loudspeaker channel at a certain time, to represent the unknown sound source for the listener located at the position 1901 of (0, 0, 0). Based on the given location of loudspeaker channel (standard location or configurations received with audio file) and respective sound gain values for each channel, a 3D location of a major sound source may be determined for each VR video frame. For some embodiments, multi-channel speaker configurations used in multi-channel encoding procedures may be given as auxiliary information within a multi-channel audio file. The recipient VR server may use that information to locate a sound source.

For example, in the 7-channel speaker layout of FIG. 19, each speaker's fixed location (L) in a polar coordinate system may be received in the following multi-channel audio file format:

Front Center=(1, 0, 0) for speaker 1907;
Front Left=(1, 0.3, 0) for speaker 1903;
Front High Left=(1, 0.45, 0.45) for speaker 1904;
Front Right=(1, −0.3, 0) for speaker 1908;
Front High Right=(1, −0.45, 0.45) for speaker 1909;
Rear Left=(−0.21, 0.3, 0) for speaker 1906;
Rear Right=(−0.21, −0.3, 0) for speaker 1905;

where (alpha, beta, distance) can be used to denote the azimuth angle of the speaker, the elevation angle of the speaker, and the distance of the speaker from the listener, respectively.

In this example, the listeners position 1901 is fixed at (0, 0, 0) and the following relative panning gains (g) are used for each speaker: Front Center=0.1024, Front Left=0.9913, Front High Left=0.0736, Front Right=0.0297, Front High Right=0.0216, Rear Left=0.0101, and Rear Right=0.0076. Based on the previous algorithm, the location of the sound source $P(x_p, y_p, z_p)$ may be calculated with the following equation after normalizing the gain weightings:

$$P(x_p,y_p,z_p)=g_C \cdot L_C + g_{FL} \cdot L_{FL} + g_{FHL} \cdot L_{FHL} + g_{FR} \cdot L_{FR} + g_{FHR} \cdot L_{FHR} + g_{RL} \cdot L_{RL} + g_{RR} \cdot L_{RR} \quad \text{Eq. 16}$$

As calculated with Eq 16, sound source 1903 may be located at approximately (1, 0.4, 0.3). A similar method may be used with the 9-channel example shown in FIG. 20.

Figure 20:
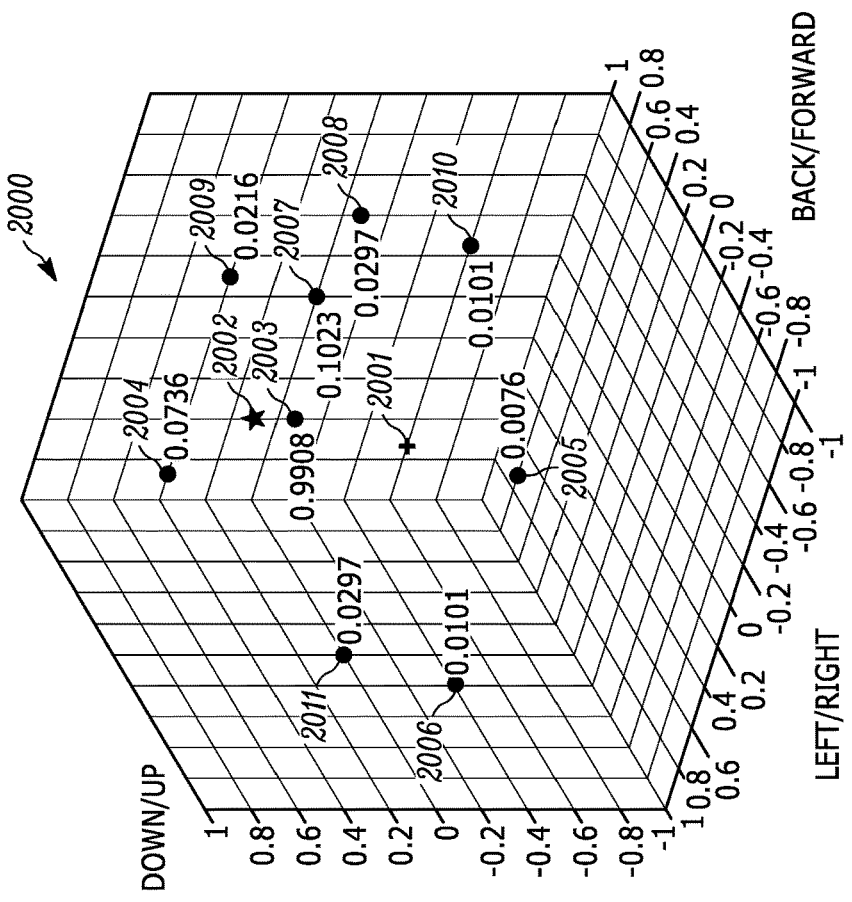
FIG. 20 is a 3D plot of loudspeaker weights and sound source locations for a 9-channel example.

FIG. 20 is a 3D plot 2000 of loudspeaker weights and sound source locations for a 9-channel example. For FIG. 20 the listener is shown in the center of the coordinate system at (0, 0, 0) with a plus ("+") at listener location 2001. A single sound source is shown as a star in the top center of the coordinate system at sound source location 2002, located at a position that may be calculated similarly to the calculation described for FIG. 19—but with the inclusion of two additional speaker locations. Loudspeakers 2003-2011 are shown at indicated positions, along with their associated sound weights. The sound weights differ from those in the similar example if FIG. 19 because of the presence of the two additional speakers 2010 and 2011, but may result in the same perceived location for sound source 2002 as for sound source 1902 of FIG. 19.

Calculating Audio Weights Based on Frequency and Loudness of Sound Objects.

Using audio source locations within a video frame at each time epoch, audio contextual weights may be assigned for each tile. One embodiment assigns a maximum weight for a tile that contains a sound source and assigns a minimum weight to the remaining tiles. However, the weight for tiles containing sound sources may be further classified by using sound pressure (or loudness) and frequency of sound objects. For many embodiments, only sound objects perceived by a user are assigned a contextual weight. According to common psychoacoustics theories, humans have different sensitivities to sounds of different frequencies.

Figure 21:
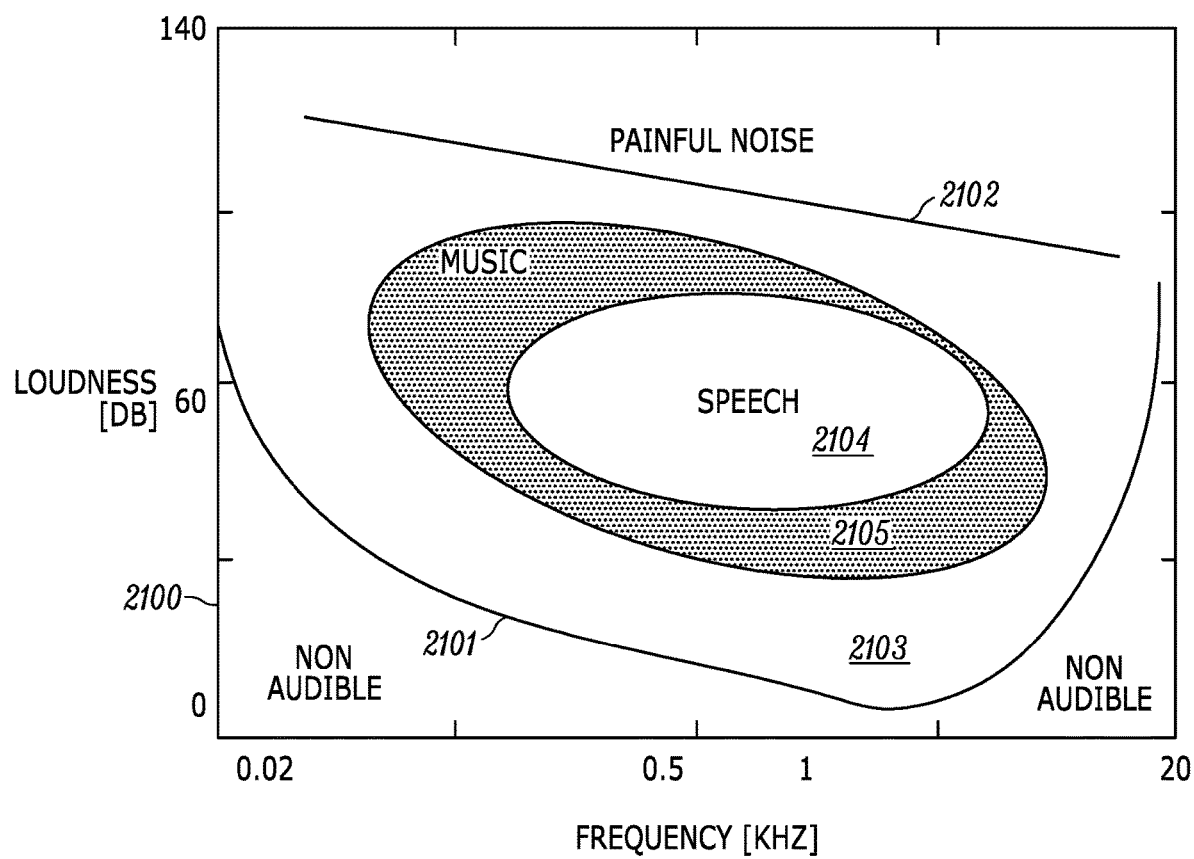
FIG. 21 is a graph of loudness vs. frequency that shows the hearing region for humans.

FIG. 21 is a graph 2100 of loudness vs. frequency that shows the hearing area for humans. See H. Fastl and E. Zwicker, *Psychoacoustics: Facts and Models*, page 1, Springer (1990). The actual hearing area lies between a threshold of quiet 2101 and a threshold of pain 2102, which are shown as black lines at the top and bottom of the graph, respectively. The human hearing area lies between, indicated as region 2103. The threshold of quiet 2101 is a function of frequency for a pure tone with a sound pressure level that is just barely audible. Referring to FIG. 21, humans are generally more sensitive to sounds in the 2 kHz to 5 kHz frequency range. Human speech is in frequency and volume region 2104, conveniently located within hearing region 2103, and music occupies a slightly larger region indicated as region 2105. Although every human has a different threshold of quiet 2101, most humans have similar tendencies for sound perception. If the frequency of a sound object has a frequency around 4 kHz, a user may more easily perceive that sound object than one at 100 Hz. Therefore, the contextual weight of a sound object may be estimated based in part on a sound's frequency. Based on the sound source's location, frequency, and loudness, audio contextual weights may be calculated for each video tile.

In some embodiments, an audio contextual weight for a spatial region (such as a tile) of video during a particular temporal period is calculated as being a value that is proportional to a loudness of an audio source associated with that spatial region during that period. An audio source associated with a region may be, for example, an audio source having a source vector direction that corresponds to a viewing direction of the spatial region of the video. In some embodiments, the audio contextual weight may be calculated as a value proportional to the loudness of an audio source associated with that spatial region, weighted by a function of the frequency (or frequencies) of the audio source, where the function of the frequency may represent the sensitivity of the human ear. The largest values of the function may be in the 2 kHz to 5 kHz frequency range. In some embodiments, the audio contextual weight may be based wholly or in part on a change in loudness. For example, a spatial region in which an audio source increases sharply in loudness may be assigned an audio contextual weight that is greater than the audio contextual weight of a different region in which a source, though louder in absolute terms, maintains a relatively constant volume.

In some embodiments, audio contextual weight is calculated based on a brief time delay relative to the audio characteristics of sources within a spatial region. For example, if a viewer of a 360-degree video hears a sudden sound off to the side, it may take some time (e.g. on the order of one second) for the user to turn his head in the direction of the sound. To account for this delay, an audio contextual weight at a time T may be based in some embodiments on audio characteristics at earlier time (T—d), where d is a delay period that may be predetermined or may be determined by context. For example, d may have its greatest value for spatial regions that are, or are predicted to be, directly behind the user.

In some embodiments, a determination is made that a significant audio event is present in the spatial region in response to a determination that the audio contextual weight for the tile is above a threshold level. In some embodiments, the threshold level is a predetermined threshold level. In some embodiments, the threshold level may be context dependent, for example the threshold level may be set as a fraction or a multiple of a spatial and/or temporal average of audio contextual weights.

In some embodiments, a determination is made that a significant audio event is present in a spatial region if the spatial region is one of the regions having the greatest audio contextual weight. For example, the spatial regions having the N greatest values of the audio contextual weight (in a particular period or over a number of periods) may be determined to have a significant audio event, where N is an integer greater than or equal to one.

In some embodiments, a determination is made that a significant audio event is present in a spatial region (e.g. a tile) in response to a determination that a loudness of an audio source associated with that spatial region exceeds a threshold. This may be done with or without separate calculation of an audio contextual weight. In some embodiments, a determination is made that a significant audio event is present in a spatial region in response to a determination that the current loudest audio source (or one of the N loudest sources) is located in the spatial region.

Calculating User Contextual Weights.

For many embodiments, user contextual weight may be calculated based on the user device type, the current user FOV, and the human physical model. If the VR client type uses an HMD, the interaction may be characterized by a model of a users physical head movements. The HMD's movement model may be characterized by 6 degrees of freedom. Humans generally move their eyes more naturally in the horizontal direction than in the vertical direction. For this reason, the tiles which are located in the horizontal direction may have higher contextual weights in an HMD environment. For example, if a tile is located at a horizontal direction in a potential future focal point, the tile may have a higher contextual weight due to human characteristics.

If a VR client type uses a PC or tablet screen display, the interaction with VR video may be characterized by a mouse- (PC) or hand-touch-(tablet) based interaction model. For example, the mouse/touch-based click-and-drag interaction may navigate more freely in an xyz-axis system compared to an HMD model. For this reason, some embodiments may not bias tiles according to horizontal/vertical directions if the client type is expected to use a PC or tablet display.

Application to a Pull-Based Streaming Server Model.

The previous discussion used a system where a VR contents server selected and transmitted tiles to user device based on contextual weights with a push-based video streaming model. This next section explains how a pull-based video streaming model, such as MPEG-DASH standard, may be used.

Figure 22:
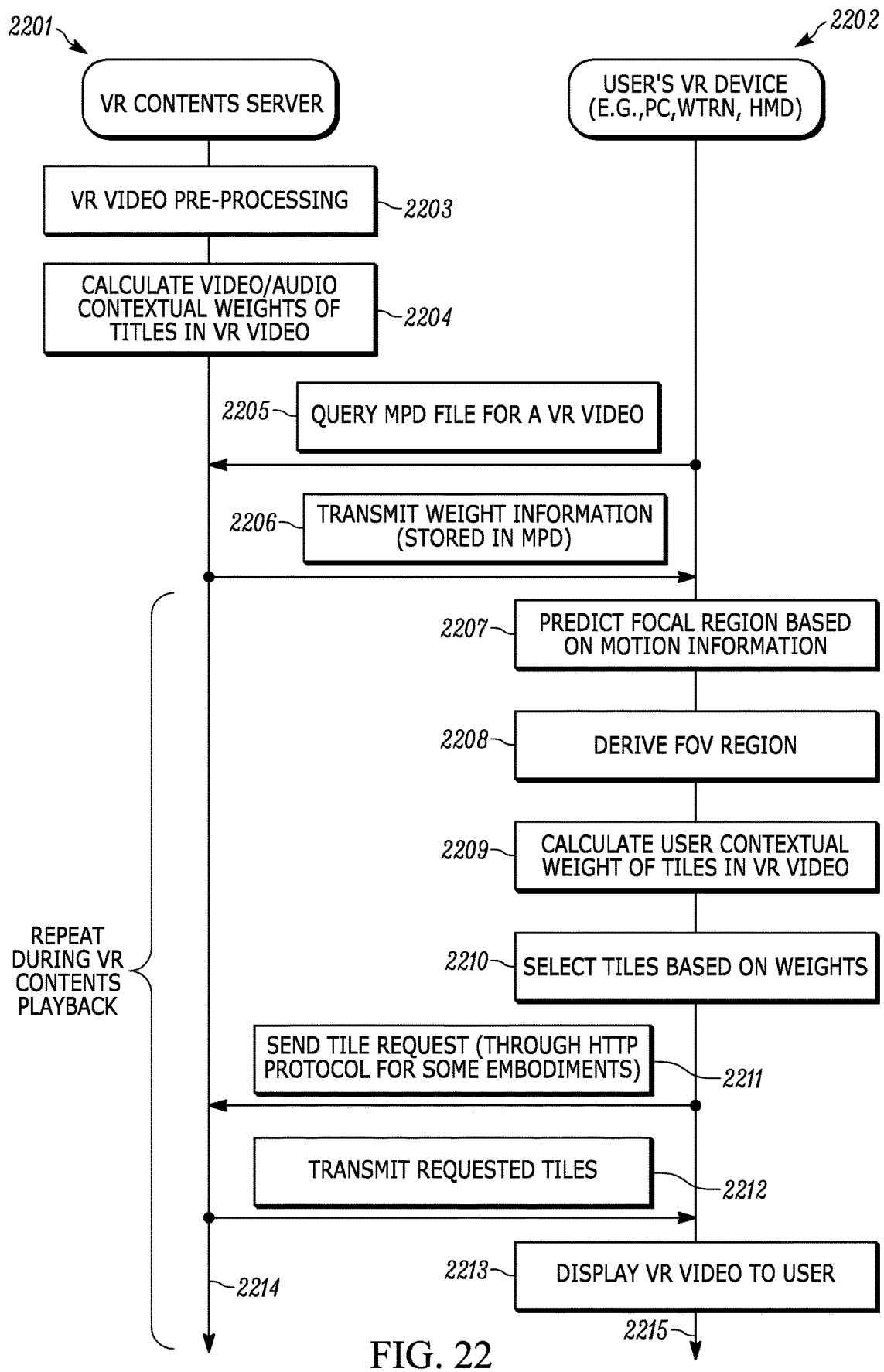
FIG. 22 is a message sequence diagram of an exemplary embodiment for calculating tile weights and selecting, encoding, and displaying VR video tiles for a pull-based model.

FIG. 22 is a message sequence diagram of an exemplary embodiment for calculating tile weights and selecting, encoding, and displaying VR video tiles for a pull-based model. FIG. 22 is somewhat similar to FIG. 6, although a user device queries a VR contents server for a media presentation description (MPD) file for VR video and also transmits a request indicating a region to have higher video quality. For an exemplary embodiment, there are two sub-processes illustrated for a first temporal video segment: A server process 2201 runs on a VR content server to generate video tiles, while a client process 2202 runs on a users VR device, which may include a client computer, possibly a PC or game device, and a display. The display may be a PC or tablet screen or an HMD that is coupled to the client computer either via a cable or wirelessly with a WLAN, such as a WTRU. VR video is pre-processed in box 2203 and video and audio weights are calculated in box 2204. The users device submits a query and transmits motion information to a VR contents server for the current FOV of the user in box 2205.

The VR contents server transmits weight information stored in the MPD file to the users VR device in box 2206. For some embodiments, an MPD file may include additional metadata information for a tile, such as video and audio contextual weights and the size and composition of tiles in the video. The tile information may be transmitted as an additional file to be downloaded from a provided URL address. For some embodiments, segment information may have subordinate element titles, such as a "Tile Sub-Segment," which contain a dedicated URL address for each tile in a media segment. In one embodiment of a pull-based model, a users VR device calculates focal region predictions based on motion information in box 2207, determines at least one FOV region in box 2208, calculates user contextual weights in box 2209, and selects specific tiles based on weights in box 2210. The user VR device sends a tile request to the VR contents server in box 2211, which may be sent through an HTTP protocol for some embodiments. The VR contents server transmits the requested tiles back to the user's VR device for display in box 2212, which are then displayed for the user in box 2213. The process repeats for the subsequent temporal segments of video as indicated by process flow continuations 2214 and 2215, and may iterate during the user's VR experience. These processes are described in more detail below.

Pre-Processing of VR Contents.

If certain VR video content is uploaded to a server, the server is able to calculate video and audio contextual weights of the VR contents. Similar to the push-based model of FIG. 6, for one embodiment, the VR server calculates video and audio contextual weights of each tile in every video chunk as a metadata file, such as the MPD file of the MPEG-DASH protocol.

Querying and Transmitting of Weight Metadata Information.

Figure 23:
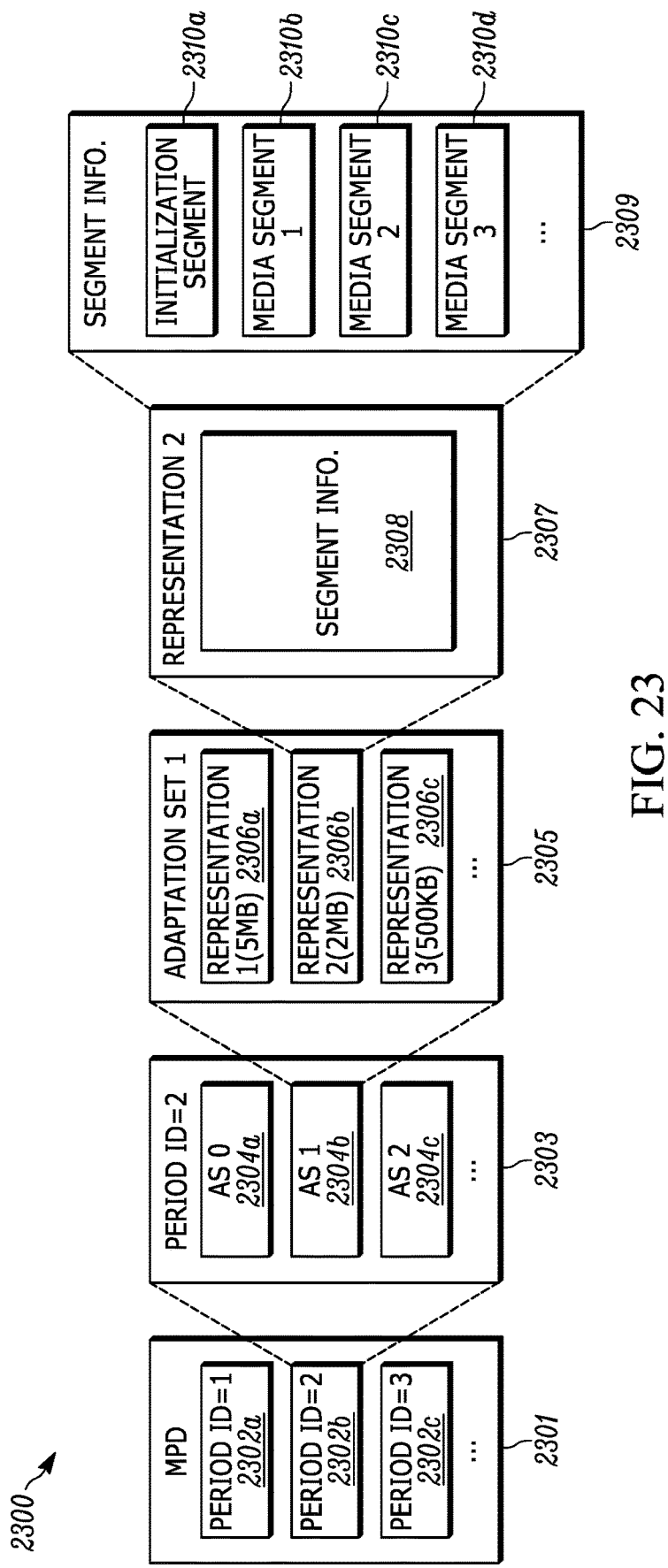
FIG. 23 is a block diagram showing a hierarchical structure for an embodiment of media presentation data.

FIG. 23 is a block diagram showing a hierarchical structure 2300 for an embodiment of media presentation data, for example an MPD file 2301. A media presentation in the MPEG-DASH protocol has several elements composed of a hierarchical structure of multiple layers. The largest element is a Period, exemplary Periods 2302a-c are illustrated with IDs set to 1, 2, and 3, respectively. As illustrated in the expanded view 2303 of Period 2302b (Period 2), a Period contains of one or more Adaptation Sets. Exemplary Adaption Sets 2304a-c are illustrated within Period 2302b (Period 2). As illustrated in the expanded view 2305 of Adaptation Set 2304b (Adaption Set 1), an Adaption Set contains of one or more Representations. Exemplary Representations 2306a-c are illustrated in expanded view 2305 of Adaptation Set 2304b (Adaption Set 1). Multiple Representations 2306a-c in the same Adaptation Set 2304b (Adaption Set 1) are alternatives to each other and may contain differently encoded versions of the same source. A Representation indicates alternative choices of the media content that may differ by encoding parameters, such as bit rate, resolution, language, and codec. A Representation contains of one or more Segments; an expanded view 2307 of Representation 2306b (Representation 2) shows one such exemplary Segment Information 2308, although more could be used. An expanded view 2309 of Segment Information 2308 indicates multiple components 2310a-d, although more could be used. These illustrated segments include an Initialization Segment 2310a, and Media Segments 2310b-c.

Figure 24:
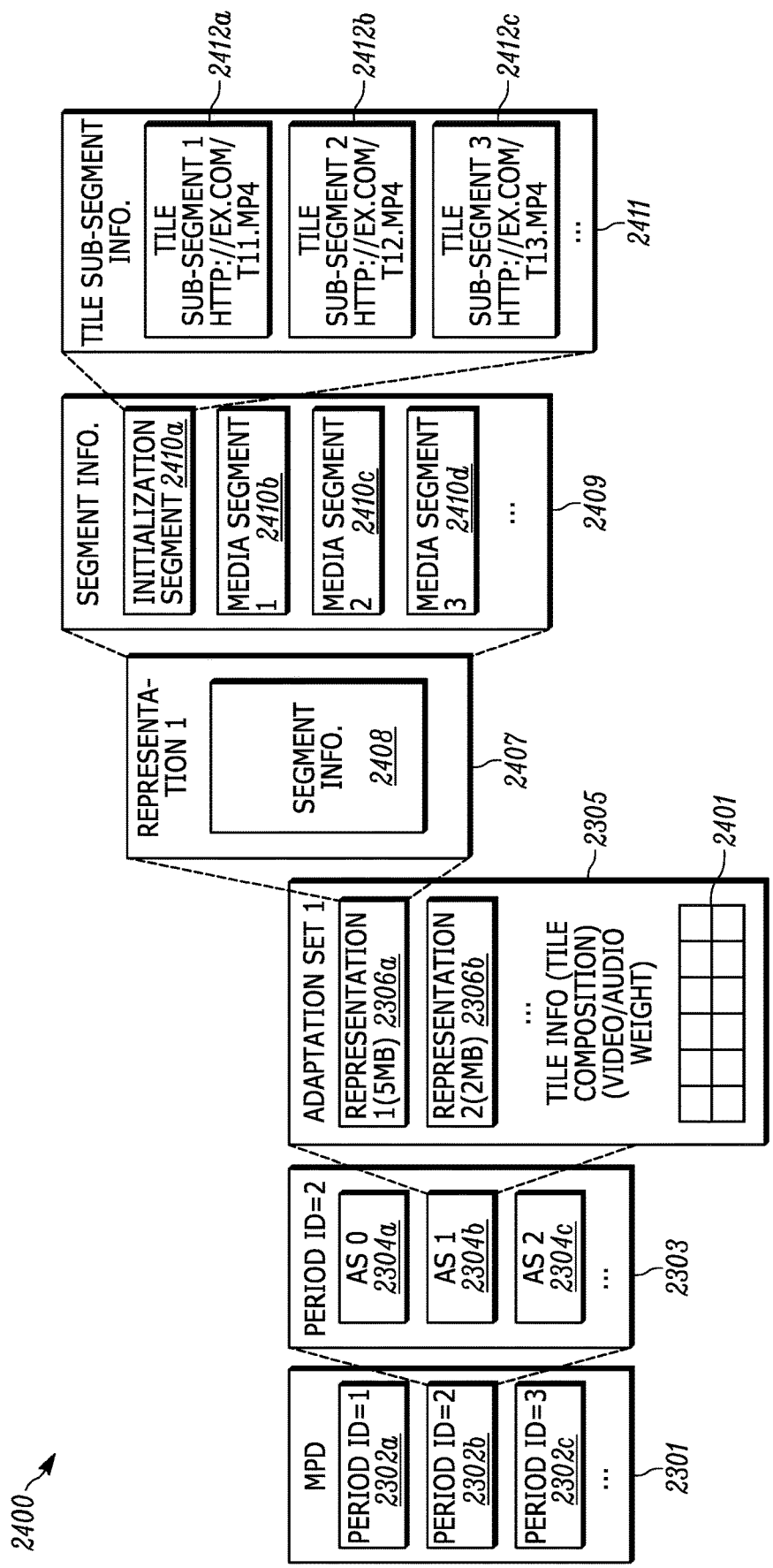
FIG. 24 is a block diagram showing a hierarchical structure for an embodiment of media presentation data with additional VR tile information data.

FIG. 24 is a block diagram showing a hierarchical structure 2400 for an embodiment of media presentation data with additional VR tile information data. FIG. 24 shows additional information over FIG. 23, and may be the same embodiment or a different embodiment. One embodiment of an MPD file 2301 may include additional metadata information for a tile, such as video and audio contextual weights and the size and composition of tiles in the video. As illustrated in the expanded view 2305 of Adaptation Set 2304b (Adaption Set 1), in FIG. 24, Adaptation Set 2304b (Adaption Set 1) additionally contains Tile Information 2401. The tile information may be included as a private attribute in an Adaptation Set element, or may be provided as an additional file which may be downloaded from a URL address. For some embodiments, segment information may have a subordinate element titled "Tile Sub-Segment," which contains dedicated URL addresses for each tile in a media segment.

An expanded view 2407 of Representation 2306a (Representation 1) shows a single exemplary Segment Information 2408, although more could be used. An expanded view 2409 of Segment Information 2408 indicates multiple components 2410a-d, although more could be used. These illustrated segments include an Initialization Segment 2410a, and Media Segments 2410b-c. An expanded view 2411 of Initialization Segment 2410a contains Tile Sub- Segment information, with multiple exemplary components 2412*a-c* shown, although more could be used. These illustrated Tile Sub-Segments 2412*a-c* show the different URLs, described previously, for example pointers to T11.mp4, T12mp4, and T13.mp4, respectively. The different URLs may contain different quality video for the same segment, and the particular one requested may be determined based upon the selected video quality for the particular spatial region.

Calculating of User Contextual Weights.

Unlike the push-based model of FIG. 6, some embodiments of a user device with a pull-model use current motion information of user and contextual information to calculate a users future focal region and FOV predictions.

Selecting Tiles Based on Weights.

Unlike the push-based model of FIG. 6, some embodiments of a user device select tiles based on video, audio, and user contextual weights calculated by the user device. For one embodiment, a user device selects tiles having the highest weighted sum values of weights for high resolution tile queries. For another embodiment, a user device uses a method similar to one described in relation to Table 1 for tile resolution queries.

Requesting and Transmitting Tiles.

As described previously, tile requests may be sent from a client device to a VR contents server in a pull-based system. In an exemplary video streaming service, a client device sends URL-based tile requests to request video tiles from a VR content server. For the example previously shown in FIG. 8, selected tiles have HTTP URLs for high resolutions while unselected tiles have HTTP URLs for low resolutions. One possible explanation for the arrangement illustrated in FIG. 8 will now be described using FIG. 25.

Determining Encoding Resolutions for Each Tile in a Video Chunk File.

Figure 25:
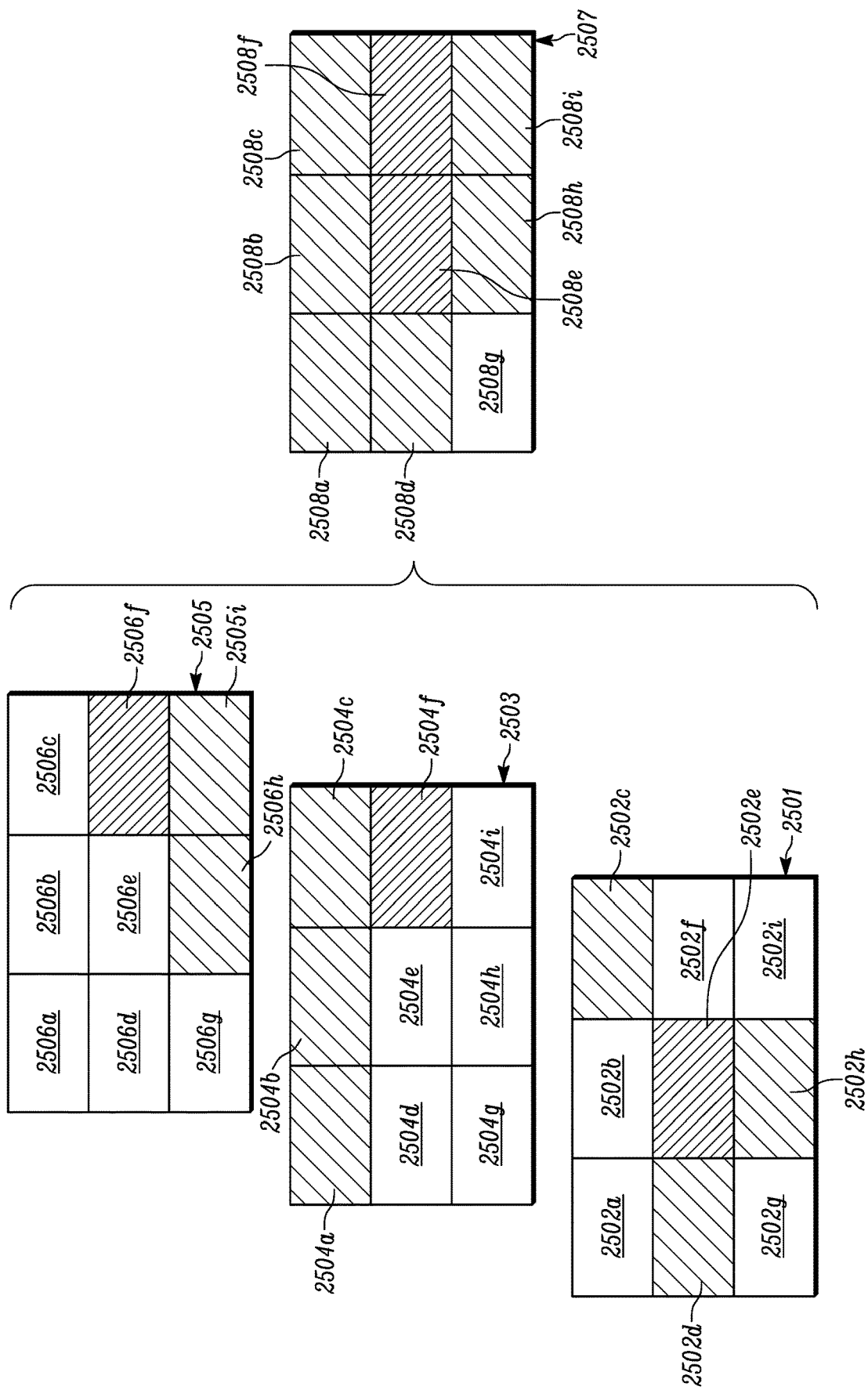
FIG. 25 illustrates a series of VR video frames showing contextual weights for tiles over time.

FIG. 25 is an embodiment of a series of VR video frames, showing contextual weights for tiles over time. Encoding resolution of a video chunk file may be determined from the contextual weights, calculated as previously described. Previous sections describe embodiments for calculation of contextual weights on each video frame and selection of encoding resolutions for each tile based on the weights. For many embodiments of a pull-based video streaming case, a video file is retrieved as a chunk file format, where each video chunk file contains multiple video frames for playout of several seconds. The final encoding resolution of tiles in a chunk file are decided based on the superset of weights from each video frame.

In VR video streaming, each VR video file may be divided into comparatively small duration chunk files, e.g. with approximately one second duration or less. According to a user's current FOV and dynamic requests, a server may frequently switch and deliver different FOV chunk files for a user in a VR streaming case. For example, if a VR video chunk file is constructed with a one-second file duration, the chunk may be composed of multiple video frames as shown in FIG. 25.

In the exemplary illustration of FIG. 25, there are nine tiles in each of shorter-duration video frames 2501, 2503 and 2505. Video frame 2501 indicates tiles 2502*a-i*, in which tile 2502*e* is indicated as highest quality with denser shading; tiles 2502*c*, 2502*d*, and 2502*h* are indicated as mid-range quality with lighter shading; and tiles 2502*a*, 2502*b*, 2502*f*, 2502*g*, and 2502*i* are indicated as lowest quality with no shading. Similarly, video frame 2503 indicates tiles 2504*a-i*, in which tile 2504*f* is indicated as highest quality with denser shading; tiles 2504*a-c* are indicated as mid-range quality with lighter shading; and tiles 2504*d*, 2504*e*, and 2504*g-i* are indicated as lowest quality with no shading. Also similarly, video frame 2505 indicates tiles 2506*a-i*, in which tile 2506*f* is indicated as highest quality with denser shading; tiles 2504*h* and 2504*i* are indicated as mid-range quality with lighter shading; and tiles 2506*a-e* and 2504*g* are indicated as lowest quality with no shading. The series of video frames 2501, 2503 and 2505 can lend itself to a possible interpretation that the depicted scene is changing, with events in different tiles having contextual weights that change over time, starting in the center of the frame, and then moving to the right.

Each tile in a video frame has its own contextual weight. The final encoding resolution of tiles in a chunk file may be determined based on a superset of weights from each video frame. If a tile is marked as an important tile during any video frame in the video chunk, that tile may be encoded with a high resolution through the video chunk file. If a tile lacks an important tile marking during any video frame within the chunk, that tile may be encoded with a low resolution throughout the video chunk duration.

For the example shown in FIG. 25, the center and right center tiles each had a high quality, due to a high relative contextual weight, in at least one of video frames 2501, 2503, and 2505. The lower left tile in each of video frames 2501, 2503, and 2505, consistently had the lowest quality because of a low contextual weight. Thus, all lower left tiles in the video chunk file will a low resolution. The remaining tiles will have a mid-range quality, because of a mid-range contextual weight in at least one of the video frames. Video frames 2501, 2503, and 2505 may be combined into a video chunk file, and the tiles for the video chunk file may be requested with a quality based upon the combination 2507, shown on the right side of FIG. 25. As indicated, due to the combined contextual weights in the set of video frames 2501, 2503, and 2505, center region 2508*e* and center-right region 2508*f* are to be requested with the highest quality; lower left region 2508*g* is to be requested with the lowest quality; and the remaining regions, 2508*a-d*, 2508*h*, and 2508*i* are to be requested with mid-range quality. These requests are for a video chunk file. In an exemplary embodiment, requesting a higher or lower quality my include requesting a higher or lower resolution.

Recall that, for the exemplary embodiment of FIG. 8, tile 802*g* was the lowest quality tile, tiles 802*a-d* and 802*h-i* were encoded with a higher (mid-range) quality, and tiles 802*e-f* were encoded with the highest quality. This video chunk tile quality determination, thus described for FIG. 25, is one possible method by which temporal factors among video segments could have possibly produced the results illustrated in FIG. 8.

Use Cases.

By using video clues and estimating the location of audio sources in specific tiles in a video frame, a VR system may determine regions of interest and a direction where α viewer may look and encode those determined regions with high resolution tiles. The following examples explain how to apply systems and methods described herein in a VR game and a VR video streaming scenario, respectively.

VR Game Example.

Figure 26:
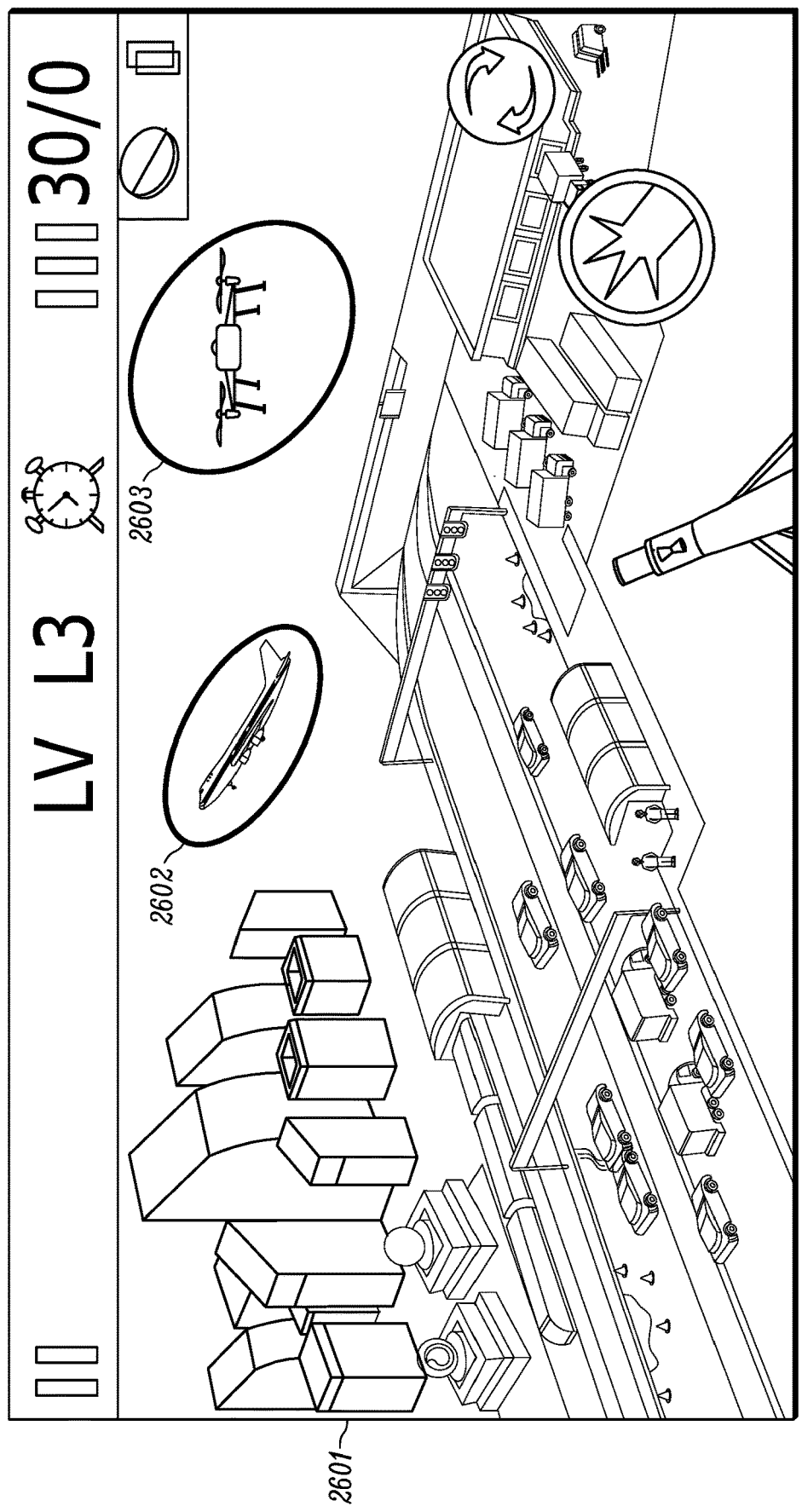
FIG. 26 is an example VR gameplay screenshot highlighting the main audio source objects.

FIG. 26 is a plan view of an example VR gameplay screenshot 2601 highlighting the main audio source objects. As seen in FIG. 26, there may be one or more major audio objects in an interactive VR video game in a certain time epoch, such as the illustrated jet airplane 2602 or a hovering drone aircraft 2603. Unlike the VR video streaming case, where the pre-recorded video file may already be stored on the streaming server, the VR game server may dynamically generate VR gameplay video frames in real-time according to a player's feedback and FOV. The VR game server may give higher priority to video objects that embed active audio sounds during gameplay. Any game objects that generate loud sounds may be treated with higher priority and encoded with higher resolutions. Video frames with increased resolution rate for detected region-of-interest (ROI) tiles having higher audio contextual weight may be transmitted to a game player likely to focus on sound-emitting objects during VR gameplay. Thus, contextual weighting may incorporate both pre-processing of pre-existing events for objects within the VR video and real-time processing of dynamic objects, including player avatars and player-caused incidents such as explosions, that are not available for pre-processing.

VR Video Streaming Example for Push/Pull-Based Streaming Cases.

Figure 27:
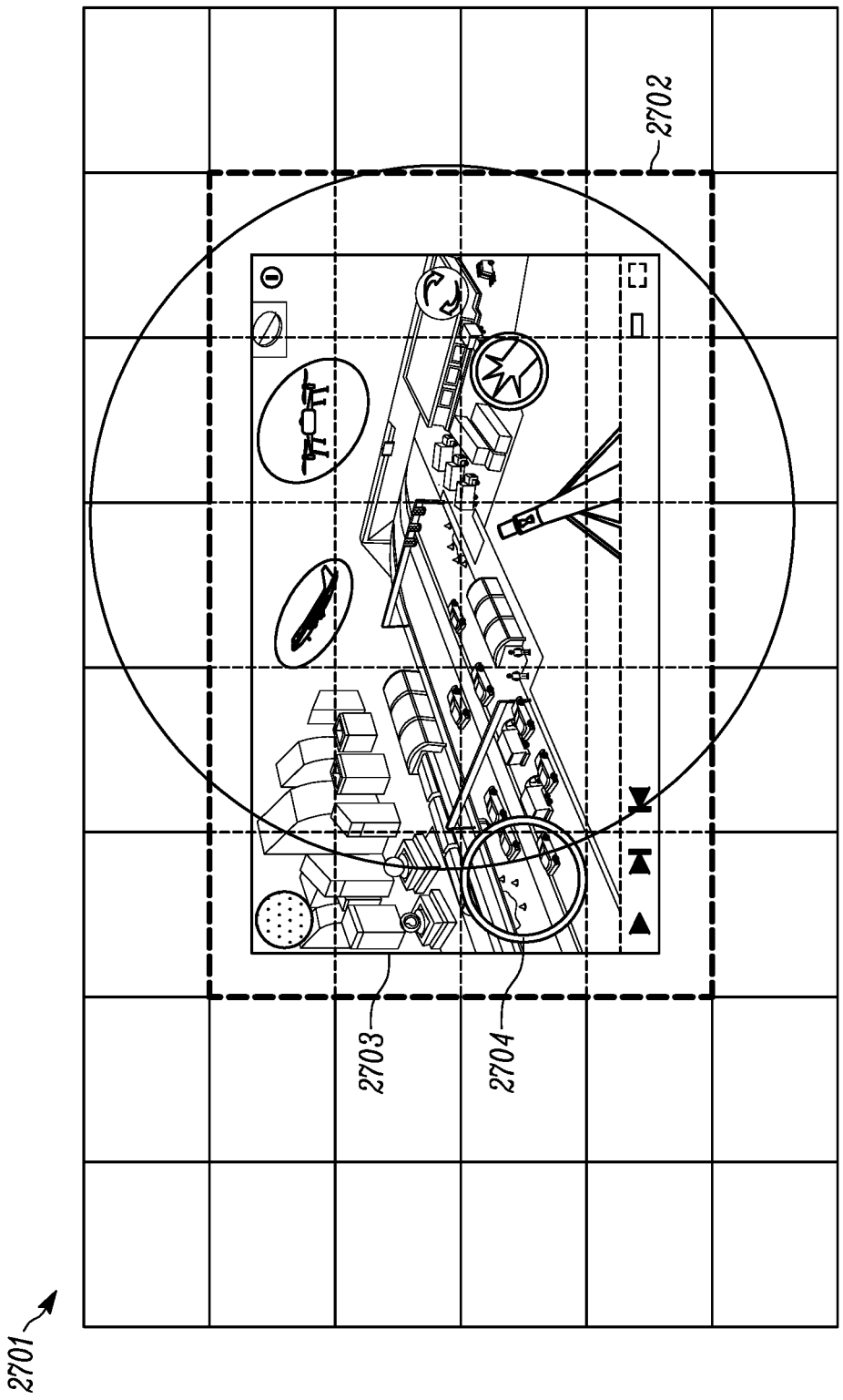
FIG. 27 is a an example current frame of selected video tiles transmitted by a streaming server.

FIG. 27 illustrates an example current frame of a total set of available tiles 2701, with a set of selected video tiles 2702 transmitted by a streaming server, that include a users FOV 2703. For many embodiments, the streaming server may store tiled video along with video and audio contextual weights acquired during a pre-processing phase. The streaming server may receive the motion information from the users HMD, via a client operated by the user. For example, the user may move his/her FOV to the left. Referring to the received motion information, the streaming server calculates a future focal point prediction, focal region, and FOV region. The streaming server may calculate user contextual weights and final weights of whole tiles. As described previously, some of the tiles may comprise specific video and audio objects which may attract the users attention. These tiles may have a higher contextual weight and a higher final weight. The streaming server selects tiles based on a final weight (or KPI value) of a respective tile. For example, in addition to the previously-identified jet airplane and hovering drone aircraft, there may be an additional event that attracts the user's attention, indicated by circle 2704.

Figure 28:
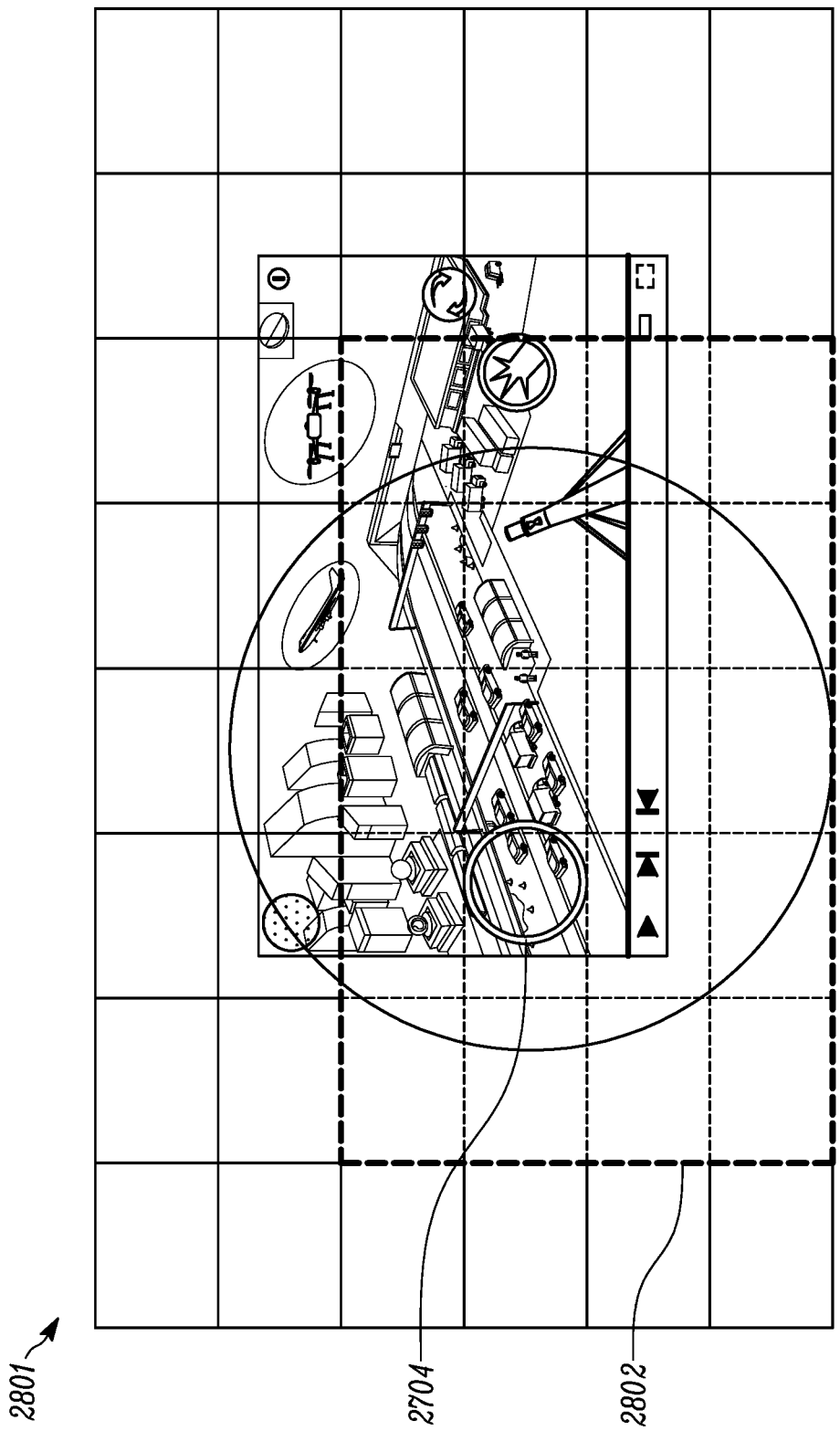
FIG. 28 is an example next frame of selected video tiles transmitted by a streaming server.

FIG. 28 illustrates an example next frame of a total set of available tiles 2801, with a set of selected video tiles 2802 that include the user's predicted FOV. The future FOV prediction is based, in this example, upon the event that attracts the user's attention in circle 2704. Thus, circle 2704 is more centered within the set of video tiles 2802 than it was in the set of selected video tiles 2702 of FIG. 27. The streaming server may transmit the new set of selected tiles 2802 with higher quality, and non-selected tiles (those within total set 2801 but not within set 2802) with lower quality to the user device for the next frame. FIG. 28 shows how the set of selected tiles 2802 has shifted leftward and downward in comparison with the set of selected tiles 2702 in FIG. 27. This may be responsive to a significant event that attracts the users attention, indicated by circle 2704.

For a pull-based streaming server model case, for a pre-processing phase, the streaming server calculates video and audio contextual weights of the video and stores the weights in an MPD file. If a users HMD plays the video, the streaming server transmits an MPD file to the users HMD. Based on transmitted video and audio contextual weights and locally calculated user contextual weights, the user's HMD selects tiles and sends a tile request to a streaming server. The streaming server may transmit not only the requested tiles at a high resolution but also unselected tiles with a low resolution to the user's HMD. In a time series of VR video tiles a users focal region may move in relation to a video frame. When the users focal point shifts, a new FOV is calculated.

Methods have thus been described for sending video, including 360-degree VR video to a client, the video comprising a plurality of spatial regions, at least one method comprising: selecting a video quality level for each of a plurality of the spatial regions, wherein the selection of the quality level of a spatial region is based at least in part on characteristics of an audio source in the respective spatial region; and sending the spatial regions of the video to the client at the respective selected video quality levels. A method has been described for sending video to a client, the video comprising a plurality of spatial regions, each spatial region having a plurality of temporal segments, the video including at least a first spatial region having a first temporal segment, the method comprising: determining whether a significant audio event is present in the first temporal segment of the first spatial region; selecting a video quality level based on whether a significant audio event is present in the first temporal segment; and sending the first temporal segment of the first spatial region to the client at the selected video quality level.

In some embodiments of a method of delivering video, wherein the video includes a plurality of temporal segments, each temporal segment having a plurality of spatial regions, the method comprises sending a first temporal segment of video to a client, wherein a first spatial region in the first temporal segment associated with a first direction of view is sent with a higher video quality than a second spatial region in the first temporal segment that is not associated with the first direction of view; determining that a first significant event has occurred during a second temporal segment that is subsequent to the first temporal segment, the significant event occurring in a second direction of view; and sending the second temporal segment of video to the client, wherein responsive to determining that the significant event has occurred during the second temporal segment, a third spatial region in the second temporal segment associated with the second direction of view is sent with a higher video quality than a fourth spatial region in the second temporal segment that is not associated with the second direction of view. A spatial region associated with a direction of view may comprise the set of tiles that contain a calculated FOV region.

In some embodiments of the method, the first significant event comprises an audio event and/or a video event, and higher video quality comprises higher resolution. Alternatively, or additionally, higher video quality can comprise one or more of higher bit rate, higher frame rate, and smaller QP. In some embodiments of the method, determining comprises determining on a server that is sending the first and second temporal video segments. In some embodiments of the method, determining comprises determining on the client, and the method further comprises sending, from the client to a server that sent the first second temporal video segment, a request indicating the third spatial region to have higher video quality. The first direction of view may be determined based upon information from the client regarding a user's direction of view and the method may further comprise calculating a contextual weight of the first significant event, wherein the contextual weight may be an audio contextual weight or a video contextual weight. Some embodiments of the method may further comprise calculating audio contextual weights for a plurality of tiles in the second temporal segment, including the first significant event; calculating video contextual weights for the plurality of tiles in the second temporal segment, including a second significant event; calculating a predicted focal region based, at least in part, on the audio contextual weights and the video contextual weights; determining a FOV region based on the predicted focal region; and selecting one or more tiles from the plurality of tiles to encode at a higher quality based, at least in part, on the audio contextual weights and the video contextual weights. The method may further comprise calculating a user contextual weight based on a model of a users physical head movements, wherein calculating a predicted focal region is further based on the user contextual weight, and selecting one or more tiles from the plurality of tiles to encode at a higher quality is further based on the user contextual weight.

Some embodiments may comprise a processor; and a non-transitory computer-readable medium storing instruction that are operative, if executed on the processor, to perform the functions thus described.

In some embodiments, calculating an audio contextual weight may comprise: calculating a source vector of the significant audio event; obtaining a sound source location; determining a sound loudness and a frequency of the significant audio event; determining an audio weight based at least in part on the sound loudness and the frequency of the significant audio event; and calculating audio contextual weights for the first and second temporal portions of the video. In some embodiments, calculating audio contextual weights for a plurality of tiles comprises: assigning a higher (maximum) weight for a plurality of tiles that contain an associated sound source; and assigning a lower (minimum) weight for a plurality of tiles that do not contain an associated sound source. In some embodiments, calculating audio contextual weights for a plurality of tiles comprises: calculating audio weights for a plurality of tiles is further based on location, frequency, and loudness of the associated sound source.

In some embodiments, determining a significant audio event may comprise: determining sound source vectors for sound sources from spatial sound scene data; determining degrees of arrival based on the sound source vectors; and determining the significant audio event as the dominant sound source location. In some embodiments, determining a significant audio event may comprise: calculating a location of a dominant sound source from locations of loud speakers and associated gains.

In some embodiments, calculating video contextual weights for a plurality of tiles comprises: assigning a higher (maximum) weight for a plurality of tiles that contain a main object; and assigning a lower (minimum) weight for a plurality of tiles that do not contain a main object. In some embodiments, calculation of a user contextual weight may be based on a user device type, a current user field of view, and a model of a user's physical head movements.

In some embodiments, selecting one or more tiles from the plurality of tiles to encode at a higher quality may be based on a KPI, which comprises a weighted sum of the video weights, audio weights, and user contextual weights calculated for the plurality of tiles; available network bandwidth; a viewing environment of a user; and a requested video quality of the user.

In some embodiments, selecting one or more tiles from the plurality of tiles to encode at a higher quality may comprise: encoding one or more tiles at a highest quality for a plurality of tiles that contain an associated sound source, a main video object, and an associated user head direction; encoding one or more tiles at a high quality for a plurality of tiles that contain only two of the following items: an associated sound source, a main video object, and an associated user head direction; encoding one or more tiles at a mid-range quality for a plurality of tiles that contain an associated sound source or an associated user head direction but do not contain a main video object; encoding one of more tiles at a low quality for a plurality of tiles that contain a main video object but not an associated sound source not an associated user head direction; and encoding one or more tiles at a lowest quality for a plurality of tiles that do not contain an associated sound source, a main video object, nor an associated user head direction.

Network Architecture.

Figure 29:
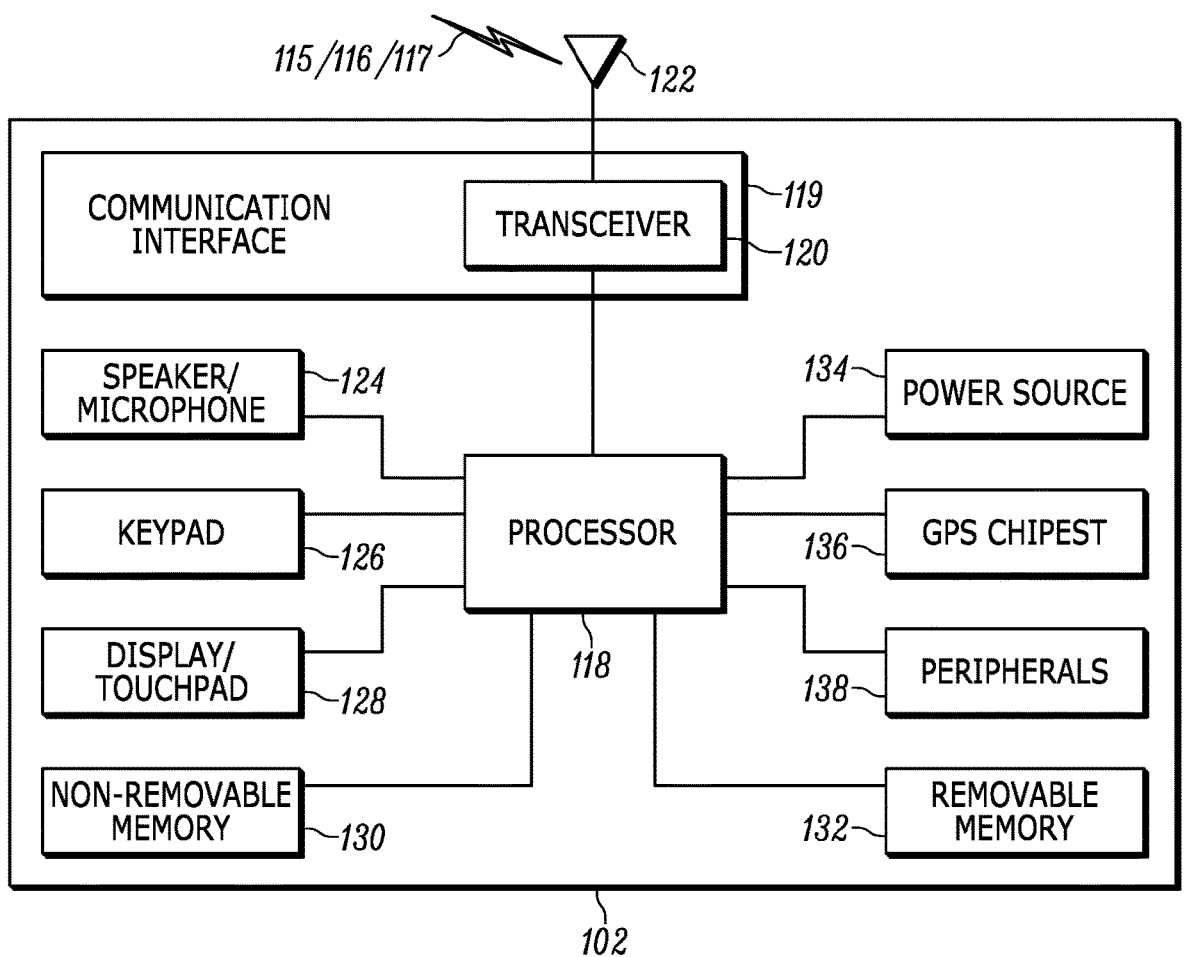
FIG. 29 depicts an example wireless transmit/receive unit (WTRU) that may be used as, for example, a 360 VR video display device.

FIG. 29 depicts an example wireless transmit/receive unit (WTRU) 102 that may be used as, for example, a 360 video display device. As shown in FIG. 29, the WTRU 102 may include a processor 118, a transceiver 120, a transmit/receive element 122, a speaker/microphone 124, a keypad 126, a display/touchpad 128, a non-removable memory 130 and a removable memory 132 (both of which may comprise non-transitory computer-readable media), a power source 134, a global positioning system (GPS) chipset 136, and other peripherals 138. The transceiver 120 may be implemented as a component of communications interface 119 that includes decoder logic. For example, the transceiver 120 and decoder logic within communications interface 119 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that serving base stations, and/or the nodes that base stations may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 29 depicts the processor 118 and the transceiver 120 as separate components, the processor 118 and the transceiver 120 may be integrated together in an electronic package or chip.

The transmit/receive element 122 may be configured to transmit signals to, or receive signals from, a base station over an air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 29 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over an air interface, depicted by additional air interface channels 115 and 117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 30:
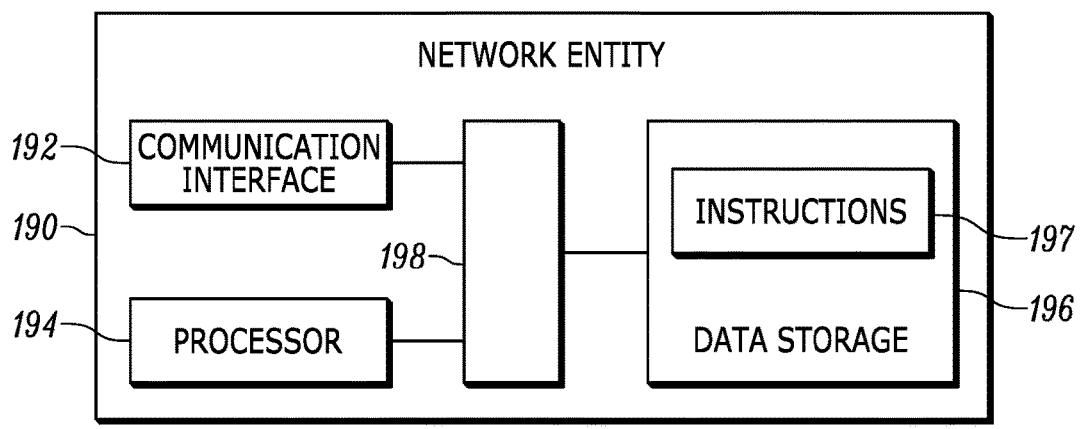
FIG. 30 depicts an exemplary network entity that may be used as, for example, a VR content server.

FIG. 30 depicts an example network entity 190 that may be used within a communication system. As depicted in FIG. 30, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art may be used. As depicted in FIG. 30, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 30. In some embodiments, one or more of such functions are carried out by a set of multiple network entities in combination, where each network entity has a structure similar to that of network entity 190 of FIG. 30. In various different embodiments, network entity 190 is—or at least includes—one or more of (one or more entities in) a radio access network (RAN), (one or more entities in) a core network, a base station, a Node-B, an RNC, a MGW, an MSC, an SGSN, a GGSN, an eNode B, an MME, a serving gateway, a PDN gateway, an ASN gateway, an MIP-HA, an AAA 186, and a gateway. And certainly other network entities and/or combinations of network entities may be used in various embodiments for carrying out the network-entity functions described herein, as the foregoing list is provided by way of example and not by way of limitation.

Note that various hardware elements of one or more of the described embodiments are referred to as "modules" that carry out (perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and those instructions may take the form of or include hardware (or hardwired) instructions, firmware instructions, software instructions, and/or the like, and may be stored in any suitable non-transitory computer-readable medium or media, such as commonly referred to as RAM or ROM.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of delivering video, wherein the video includes a plurality of temporal segments, each temporal segment having a plurality of spatial regions, the method comprising:
   sending a first temporal segment of video to a client, wherein a first spatial region in the first temporal segment associated with a first direction of view is sent with a higher video quality than a second spatial region in the first temporal segment that is not associated with the first direction of view;
   based on audio data associated with the video, determining that a first significant audio event has occurred during a second temporal segment that is subsequent to the first temporal segment, the first significant audio event occurring in a second direction of view; and
   sending the second temporal segment of video to the client, wherein responsive to determining that the first significant event has occurred during the second temporal segment, a third spatial region associated with the second direction of view in the second temporal segment is sent with a higher video quality than a fourth spatial region that is not associated with the second direction of view in the second temporal segment.

2. The method of claim 1 wherein the higher video quality comprises higher resolution.

3. The method of claim 1 wherein the higher video quality comprises at least one selected from the list consisting of: higher bit rate, higher frame rate, and smaller quantization parameter (QP).

4. The method of claim 1 wherein determining comprises determining on a server that is sending the first and second temporal video segments.

5. The method of claim 1 wherein determining comprises determining on the client and wherein the method further comprises:
   sending, from the client to a server that sent the first second temporal video segment, a request indicating the third spatial region to have higher video quality.

6. The method of claim 1 wherein the first direction of view is determined based upon information from the client regarding a user's direction of view.

7. The method of claim 1, further comprising calculating a contextual weight of the first significant event, wherein the contextual weight includes an audio contextual weight.

8. The method of claim 1, further comprising:
   calculating audio contextual weights for a plurality of tiles in the second temporal segment, including the first significant event;
   calculating video contextual weights for the plurality of tiles in the second temporal segment, including a second significant event;
   calculating a predicted focal region based, at least in part, on the audio contextual weights and the video contextual weights;
   determining a field of view (FOV) region based on the predicted focal region; and
   selecting one or more tiles from the plurality of tiles to encode at a higher quality based, at least in part, on the audio contextual weights and the video contextual weights.

9. The method of claim 8, further comprising:
   calculating a user contextual weight is based on a model of a user's physical head movements, wherein calculating a predicted focal region is further based on the user contextual weight, and selecting one or more tiles from the plurality of tiles to encode at a higher quality is further based on the user contextual weight.

10. A system comprising:
    a processor; and
    a non-transitory computer-readable medium storing instruction that are operative, if executed on the processor, to perform the functions of:
      sending a first temporal segment of video to a client, wherein a first spatial region in the first temporal segment associated with a first direction of view is sent with a higher video quality than a second spatial region in the first temporal segment that is not associated with the first direction of view;
      based on audio data associated with the video, determining that a first significant audio event has occurred during a second temporal segment that is subsequent to the first temporal segment, the first significant audio event occurring in a second direction of view; and
      sending the second temporal segment of video to the client, wherein responsive to determining that the first significant audio event has occurred during the second temporal segment, a third spatial region associated with the second direction of view in the second temporal segment is sent with a higher video quality than a fourth spatial region that is not associated with the second direction of view in the second temporal segment.

11. The system of claim 10 wherein the higher video quality comprises at least one selected from the list consisting of:
    higher resolution, higher bit rate, higher frame rate, and smaller quantization parameter (QP).

12. The system of claim 10 wherein the instruction are further operative to perform the functions of:
    calculating audio contextual weights for a plurality of tiles in the second temporal segment, including the first significant event;

calculating video contextual weights for the plurality of tiles in the second temporal segment, including a second significant event;

calculating a predicted focal region based, at least in part, on the audio contextual weights and the video contextual weights;

determining a field of view (FOV) region based on the predicted focal region; and selecting one or more tiles from the plurality of tiles to encode at a higher quality based, at least in part, on the audio contextual weights and the video contextual weights.

13. The method of claim 1, further comprising determining an audio contextual weight for the third spatial region according to a location of an audio source of the first significant audio event, wherein the audio contextual weight for the third spatial region of the second temporal segment is calculated as a value that is proportional to a loudness of the audio source within the third spatial region of the second temporal segment.

14. The method of claim 1, wherein a video contextual weight is derived for the third spatial region of the second temporal segment according to visual objects within the third spatial region of the second temporal segment.

15. The system of claim 10, further comprising determining an audio contextual weight for the third spatial region according to a location of an audio source of the first significant audio event, wherein the audio contextual weight for the third spatial region of the second temporal segment is calculated as a value that is proportional to a loudness of the audio source within the third spatial region of the second temporal segment, and determining a video contextual weight for the third spatial region of the second temporal segment according to visual objects within the third spatial region of the second temporal segment.

* * * * *